(12) United States Patent
Haylock et al.

(10) Patent No.: US 8,322,958 B2
(45) Date of Patent: Dec. 4, 2012

(54) FASTENERS WITH CONFORMING SLEEVES

(75) Inventors: Luke Haylock, Culver City, CA (US);
Hasim Mulazimoglu, Buena Park, CA (US); Liang Zeng, Irvine, CA (US)

(73) Assignee: Alcoa Inc., Pittsburgh, PA (US)

( * ) Notice: Subject to any disclaimer, the term of this patent is extended or adjusted under 35 U.S.C. 154(b) by 266 days.

(21) Appl. No.: 12/753,336

(22) Filed: Apr. 2, 2010

(65) Prior Publication Data

US 2010/0272537 A1  Oct. 28, 2010

Related U.S. Application Data

(60) Provisional application No. 61/166,664, filed on Apr. 3, 2009, provisional application No. 61/166,618, filed on Apr. 3, 2009.

(51) Int. Cl.
*F16B 13/06* (2006.01)

(52) U.S. Cl. ............... 411/69; 411/361; 411/339

(58) Field of Classification Search ............... 411/43, 411/69, 339, 361
See application file for complete search history.

(56) References Cited

U.S. PATENT DOCUMENTS

| | | |
|---|---|---|
| 2,396,661 A | 1/1944 | Keller et al. |
| 2,501,567 A * | 3/1950 | Huck ............... 411/39 |
| 3,041,912 A | 7/1962 | Krieder et al. |
| 3,215,024 A | 11/1965 | Brilmyer |
| 3,271,058 A | 9/1966 | Anderson |
| 3,304,109 A | 2/1967 | Schuster |
| 3,535,911 A | 10/1970 | Armstrong |
| 3,792,933 A | 2/1974 | Stencel |
| 3,820,297 A * | 6/1974 | Hurd ............... 403/2 |
| 3,835,615 A | 9/1974 | King |
| 3,915,052 A | 10/1975 | Ruhl |
| 3,949,535 A | 4/1976 | King, Jr. |
| 3,953,906 A | 5/1976 | Brown |
| 3,965,792 A | 6/1976 | King, Jr. |
| 4,048,898 A | 9/1977 | Salter |
| 4,102,030 A | 7/1978 | King, Jr. |
| 4,164,807 A | 8/1979 | King, Jr. |
| 4,244,661 A | 1/1981 | Dervy |

(Continued)

FOREIGN PATENT DOCUMENTS

EP  0 248 122 A2  9/1987

(Continued)

OTHER PUBLICATIONS

International Search Report issued in connection with International Appln. No. PCT/US07/78775 (3 pgs).

(Continued)

*Primary Examiner* — Flemming Saether
(74) *Attorney, Agent, or Firm* — Greenberg Traurig, LLP

(57) ABSTRACT

A sleeve interference fastener including a conformable sleeve, wherein the conformable sleeve is comprised of at least one first material having a hardness of X, and a pin member, wherein the pin member is comprised of at least one second material having a hardness of Y, wherein X is sufficiently less than Y so that, in an installed position of an interference fit, at least a portion of the at least one first material of the conformable sleeve conforms to a contour of an inner surface of a hole of a composite structure so as to create a continuous electrical contact at an interface between the inner surface of the hole of the composite structure and the conformable sleeve.

10 Claims, 21 Drawing Sheets

U.S. PATENT DOCUMENTS

| | | | |
|---|---|---|---|
| 4,405,256 A | 9/1983 | King, Jr. | |
| 4,472,096 A | 9/1984 | Ruhl et al. | |
| 4,479,163 A | 10/1984 | Bannink, Jr. et al. | |
| 4,502,092 A | 2/1985 | Bannink, Jr. et al. | |
| 4,557,033 A | 12/1985 | Champoux | |
| 4,628,402 A | 12/1986 | Covey | |
| 4,702,655 A * | 10/1987 | Kendall | 411/43 |
| 4,755,904 A | 7/1988 | Brick | |
| 4,760,493 A | 7/1988 | Pearson | |
| 4,789,283 A * | 12/1988 | Crawford | 411/43 |
| 4,813,834 A | 3/1989 | Smith et al. | |
| 4,850,771 A | 7/1989 | Hurd | |
| 4,867,625 A | 9/1989 | Dixon | |
| 4,891,732 A | 1/1990 | Jones | |
| 4,905,931 A | 3/1990 | Covey | |
| 4,943,196 A | 7/1990 | Dahl | |
| 5,018,920 A | 5/1991 | Speakman | |
| 5,129,253 A | 7/1992 | Austin et al. | |
| 5,176,481 A | 1/1993 | Schiefer | |
| D372,857 S | 8/1996 | Hirai | |
| 6,149,363 A | 11/2000 | March | |
| 6,499,926 B2 | 12/2002 | Keener | |
| 6,589,918 B2 * | 7/2003 | Denpo et al. | 508/100 |
| 6,659,699 B2 | 12/2003 | Stoewer et al. | |
| 6,665,922 B2 | 12/2003 | Schultz | |
| 7,050,286 B2 | 5/2006 | Pridham et al. | |
| 7,236,343 B2 | 6/2007 | Heidlebaugh et al. | |
| 7,277,266 B1 | 10/2007 | Le et al. | |
| 7,307,825 B2 | 12/2007 | De La Fuente De Ana et al. | |
| 7,525,785 B2 | 4/2009 | Rawlings | |
| 7,554,785 B2 | 6/2009 | Hawley | |
| 7,599,164 B2 | 10/2009 | Heeter et al. | |
| 7,695,226 B2 | 4/2010 | March et al. | |
| 7,721,990 B2 | 5/2010 | Jaeger et al. | |
| 7,738,236 B2 | 6/2010 | Stein | |
| 7,755,876 B2 | 7/2010 | Morrill et al. | |
| 7,869,181 B2 | 1/2011 | Le | |
| 7,898,785 B2 | 3/2011 | Winter et al. | |
| 2002/0119028 A1 | 8/2002 | Brown et al. | |
| 2004/0091331 A1 | 5/2004 | Schultz | |
| 2005/0144874 A1 | 7/2005 | West et al. | |
| 2007/0041143 A1 | 2/2007 | Georgeson et al. | |
| 2007/0111909 A1 | 5/2007 | Combetta | |
| 2007/0177330 A1 | 8/2007 | Ackerman et al. | |
| 2008/0075555 A1 * | 3/2008 | March et al. | 411/361 |
| 2008/0240925 A1 | 10/2008 | Kita et al. | |
| 2009/0060666 A1 | 3/2009 | Georgeson et al. | |
| 2009/0159306 A1 | 6/2009 | Loche et al. | |
| 2009/0178262 A1 | 7/2009 | Reid et al. | |
| 2010/0124472 A1 | 5/2010 | Nguyen et al. | |
| 2010/0219287 A1 | 9/2010 | Sanchez-Brunete Alvarez et al. | |
| 2010/0260572 A1 | 10/2010 | Wehrmeister et al. | |
| 2010/0272537 A1 | 10/2010 | Haylock et al. | |
| 2010/0276536 A1 | 11/2010 | Lambert et al. | |
| 2010/0277849 A1 | 11/2010 | Morrill et al. | |
| 2011/0056718 A1 | 3/2011 | Gattus et al. | |

FOREIGN PATENT DOCUMENTS

| | | |
|---|---|---|
| EP | 0 248 122 A2 | 12/1987 |
| EP | 0 468 563 A1 | 1/1992 |
| EP | 1 903 221 A2 | 6/2008 |
| JP | 7-151111 | 6/1995 |
| JP | 7151111 | 6/1995 |
| WO | 87/05976 | 10/1987 |
| WO | 8705976 | 10/1987 |
| WO | 2008/036666 A3 | 3/2008 |

OTHER PUBLICATIONS

Written Opinion issued in connection with International Appln. No. PCT/US07/78775 (4 pgs).

International Search Report and Written Opinion issued in connection with assignee's International Patent Application No. PCT/US2010/053342 entitled "Enhanced Conductivity Sleeved Fastener and Method for Making Same" (11 pages).

European Search Report from European Patent Appln. No. 07 11 6776 dated Jul. 23, 2008 (2 pgs).

International Search Report and Written Opinion from PCT/US10/29758 mailed Jul. 9, 2010.

Notice of Opposition of European Patent Application No. 07116776. 1, including English-language translation, filed Jan. 6, 2012.

ASTM International, "Standard Guide for Measuring and Reporting Friction Coefficients", Nov. 2008. pp. 1-12.

Huck International, Inc. "Huck Aerospace Fasteners for Composite Structure", © 1992.

'Guide d'emploi des traitements de surfaces appliqués aux problémes de frottement, including its English-language translation, © Technique and Documentation, 2000.

Huck Manufacturing Company, "Lightweight (GP) Interference Fit Fastener for Composite Materials", Apr. 1984.

Military Specification, Lubricant, Solid Film, Heat Cured, Corrosion Inhibiting, Nato Code No. S-1738, MIL-L-8937D, Mar. 29, 1982 superseding MIL-L-8937C, Mar. 18, 1976.

Rockwell International, Space Systems Division, "Preload Measurement in Sleeve Bolts Using an Ultrasonic Technique", Feb. 1996, by Ajay Koshti.

Oak Ridge Laboratory, Metals and Ceramics Division, "Friction and Wear of Titanium Alloys Sliding Against Metal, Polymer, and Ceramic Counterfaces", by Jun Qu, et al., Nov. 11, 2004.

Wroclaw University of Technology, Department of Mechanical Engineering, "The Statistical Correlation of the Coefficient of Friction and Wear Rate of PTFE Composites with Steel Counterface Roughness and Hardness", Wojciech Wielaba, 2002.

* cited by examiner

FASTENERS WITH CONFORMING SLEEVES

RELATED APPLICATIONS

This application claims the benefit of U.S. provisional application Ser. No. 61/166,664 filed Apr. 3, 2009, and entitled "CONFORMING SLEEVES FOR FASTENERS," and U.S. provisional application Ser. No. 61/166,618 filed Apr. 3, 2009, and entitled "CONDUCTIVE SOLID FILM MATERIAL," which are hereby incorporated by reference herein in their entirety for all purposes.

TECHNICAL FIELD

The present invention relates to interference fasteners and methods of installing such.

BACKGROUND

In certain applications, interference fasteners are in intimate contact with a structure in which they are placed. In some applications, it is desirable to have the presence of a minimal number of and/or small-sized spaces or voids, or the absence of spaces and voids altogether, between the fastener and the structure.

For example, numerous interference fasteners and accompanying sleeves are used on a single aircraft. In the case of a lightning strike on the aircraft, if a fastener/sleeve is not in intimate contact with a sidewall of a hole in the structure in which the fastener/sleeve is inserted, the instantaneous heat energy caused by the lightning ionizes the air in the voids between the fastener/sleeve and the sidewall, and creates arc plasma that blows out in the form of a spark. This is a very dangerous condition to have for an aircraft, especially if sparking occurs near a fuel tank.

With particular reference to aircraft structural components made from composite materials, such as carbon fiber reinforced plastics, these voids may be created during a process of drilling fastener holes in the composite material. Individual carbon fibers fracture at irregular angles and form microscopic voids between a fastener/sleeve and the hole. As the cutting tool wears down over time, there is an increase of surface chipping in the structure, which leads to an increase in the amount of uncut fibers or resin and delamination—also know as machining-induced micro texture.

When lightning strikes the surface of the composite structure, the current density tends to be higher around the metallic fasteners, which are commonly used to attach the various elements of the structure. These currents may create detrimental ignition sources by attaching to a fastener and flowing through the fastener to some point within the structure, which is disposed to arcing. In order to avoid this condition, the current must dissipate through the carbon fibers perpendicular to the fastener hole. As described above, if the fastener is not in intimate contact with side walls of the hole, the instantaneous heat energy ionizes the air in the voids and creates arc plasma that blows out in the form of a spark.

Additionally, electrically conductive coatings are used for a variety of applications, such as charge dissipation and radio frequency interference (EMI/RFI) shielding. The amount of direct current conductivity required is dependent upon the specific application. Electric charge buildup by dielectric substrates, such as fiberglass structures in frictional contact with other materials, can result in very large static voltages that may result in dangerous discharge sparks. The amount of surface resistivity required to effectively bleed off this charge and prevent sparking is usually rather low, $10^6$ to $10^9 \Omega/cm^2$.

SUMMARY OF INVENTION

In some embodiments, a sleeve interference fastener adapted to be installed in a hole of a composite structure comprises: a.) a conformable sleeve having a head at one end and a tubular portion, wherein the tubular portion has an inner diameter and an outer diameter, wherein the outer diameter of the tubular portion is less than an inner diameter of the hole of the composite structure, and wherein the conformable sleeve is comprised of at least one first material having a hardness of X; b.) a pin member, wherein the pin member has at least a pin head at one end, a locking portion at an opposite end of the pin head, and a shank portion therein between, wherein the shank portion, located below the pin head, has a diameter greater than the inner diameter of the tubular portion of the conformable sleeve, and wherein the pin member is comprised of at least one second material having a hardness of Y; c.) wherein X is sufficiently less than Y so that, in an installed position, at least a portion of the at least one first material of the conformable sleeve conforms to a contour of an inner surface of the hole so as to create a continuous electrical contact at an interface between the inner surface of the hole of the composite structure and the conformable sleeve; and d) wherein, upon a pressure from the shank portion of the pin member, the conformable sleeve is adapted to expand radially over the inner surface of the hole to form an interference fit between the outer diameter of the sleeve and the hole of the composite structure so as to provide the installed position.

In some embodiments, a sleeve interference fastener adapted to be installed in a hole of a composite structure comprising: a.) a conformable sleeve having a head at one end and a tubular portion, wherein the tubular portion is comprised of an inner base layer and an outer coating layer, wherein the tubular portion has an inner diameter and an outer diameter, wherein the outer diameter of the tubular portion is less than an inner diameter of the hole of the composite structure, wherein the inner base layer is comprised of at least one first material having a hardness of X, and wherein the outer coating layer is comprised of at least one second material having a hardness of Y; b.) a pin member, wherein the pin member has at least a pin head at one end, a locking portion at an opposite end of the pin head, and a shank portion therein between, wherein the shank portion, located below the pin head, has a diameter greater than the inner diameter of the tubular portion of the conformable sleeve, and wherein the pin member is comprised of at least one third material having a hardness of Z; c.) wherein X is sufficiently less than Y and wherein Z is equal to or higher than X so that, in an installed position, at least a portion of the outer coating layer of the tubular portion conforms to a contour of an inner surface of the hole so as to create a continuous electrical contact at an interface between the inner surface of the hole of the composite structure and the conformable sleeve; and d) wherein, upon a pressure from the shank portion of the pin member, the conformable sleeve is adapted to expand radially over the inner surface of the hole to form an interference fit between the outer diameter of the sleeve and the hole of the composite structure so as to provide the installed position.

In some embodiments of the sleeve interference fastener of the present invention, the outer layer of the conforming sleeve is a fixed solid coating.

In some embodiments of the sleeve interference fastener of the present invention, the permanently fixed solid coating is comprised of at least one of i) at least one organic material and at least one conductive filler material, and ii) a metal material.

In some embodiments of the sleeve interference fastener of the present invention, the metal material has at least one of Ag, Al, Au, and Ni.

In another embodiment, the sleeve interference fastener of the present invention has a hardness of X that is less than 100 HRB on Rockwell B scale.

In another embodiment of the sleeve interference fastener of the present invention, an inner surface of the hole has a sealant when the fastener is in the installed position.

In another embodiment of the sleeve interference fastener of the present invention, in the installed position, at least one first material of the conforming sleeve expunges an excess of the sealant entrapped in the inner surface of the hole.

In some embodiments of the sleeve interference fastener of the present invention, in the installed position, the conformable sleeve is sufficiently designed to avoid a sparking at the interface.

In some embodiments of the sleeve interference fastener of the present invention, to facilitate a movement of the pin member through the conformable sleeve, the fastener has the lubricant on at least one of: i) an inner surface of the tubular portion, and ii) the shank portion of the pin member.

In some embodiments of the sleeve interference fastener of the present invention, a lubricant is comprised of a conductive solid film material. In some embodiments of the sleeve interference fastener of the present invention, the conductive solid film material comprises carbon nano-tubes at a concentration between 0.05 to 30 percent of its weight.

In some other embodiments of the sleeve interference fastener of the present invention, the lubricant is sufficiently designed to at least perform one of: i) dissolving a foreign particle; ii) transporting a foreign particle; and iii) distributing heat.

Figure 1:
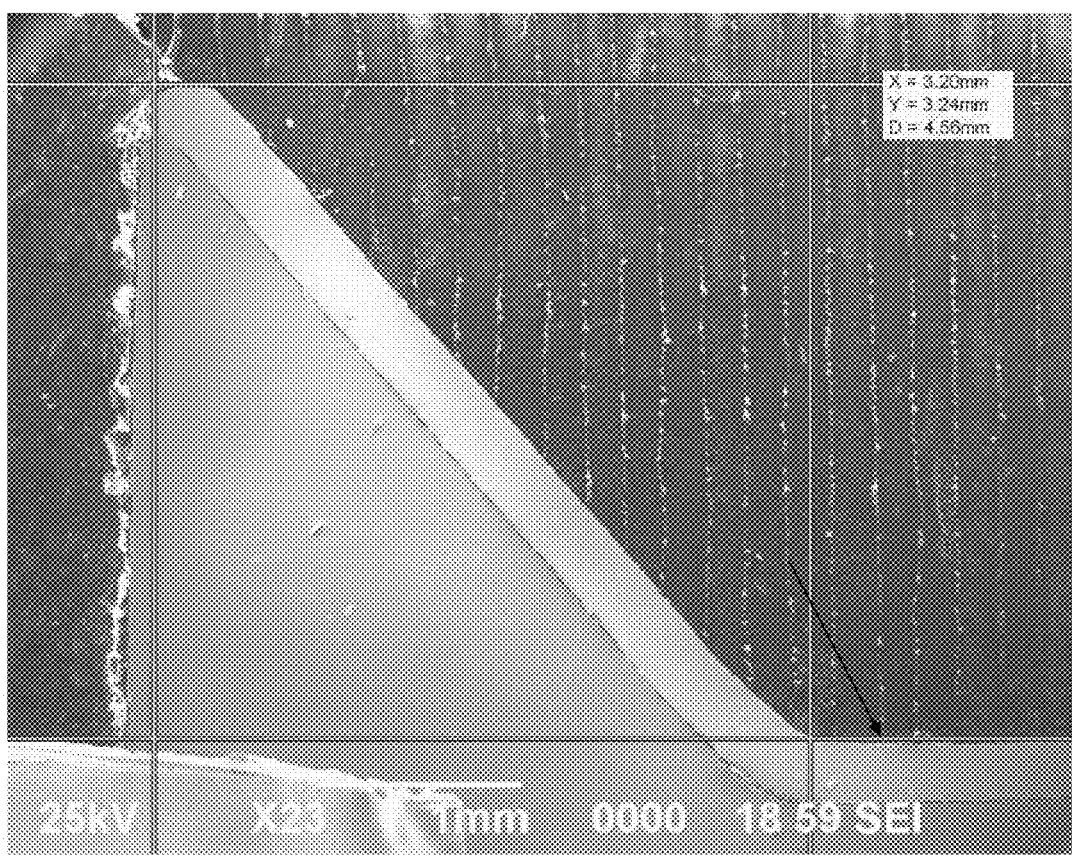
FIG. 1 shows a contact between a sleeve of a conventional fastener and a composite structure.

Among those benefits and improvements that have been disclosed, other objects and advantages of this invention will become apparent from the following description taken in conjunction with the accompanying figures. The figures constitute a part of this specification and include illustrative embodiments of the present invention and illustrate various objects and features thereof.

DETAILED DESCRIPTION

Detailed embodiments of the present invention are disclosed herein; however, it is to be understood that the disclosed embodiments are merely illustrative of the invention that may be embodied in various forms. In addition, each of the examples given in connection with the various embodiments of the invention are intended to be illustrative, and not restrictive. Further, the figures are not necessarily to scale, some features may be exaggerated to show details of particular components. In addition, any measurements, specifications and the like shown in the figures are intended to be illustrative, and not restrictive. Therefore, specific structural and functional details disclosed herein are not to be interpreted as limiting, but merely as a representative basis for teaching one skilled in the art to variously employ the present invention.

In one embodiment of the present invention is a sleeved fastener that includes a core pin and a conformable sleeve. The sleeve is designed to conform to the machine-induced micro texture inherent in fastener holes drilled in material, for example a composite material. This allows the sleeve to excavate excess entrapped sealant during installation of the fastener, while bringing the sleeve in intimate contact with the structure.

The conforming sleeve can be achieved in a variety of ways, some being more suitable for particular structures.

In some embodiments, a sleeve interference fastener adapted to be installed in a hole of a composite structure comprises: a.) a conformable sleeve having a head at one end and a tubular portion, wherein the tubular portion has an inner diameter and an outer diameter, wherein the outer diameter of the tubular portion is less than an inner diameter of the hole of the composite structure, and wherein the conformable sleeve is comprised of at least one first material having a hardness of X; b.) a pin member; wherein the pin member has at least a pin head at one end, a locking portion at an opposite end of the pin head, and a shank portion therein between, wherein the shank portion, located below the pin head, has a diameter greater than the inner diameter of the tubular portion of the conformable sleeve, and wherein the pin member is comprised of at least one second material having a hardness of Y; c.) wherein X is sufficiently less than Y so that, in an installed position, at least a portion of the at least one first material of the conformable sleeve conforms to a contour of an inner surface of the hole so as to create a continuous electrical contact at an interface between the inner surface of the hole of the composite structure and the conformable sleeve; and d) wherein, upon a pressure from the shank portion of the pin member, the conformable sleeve is adapted to expand radially over the inner surface of the hole to form an interference fit between the outer diameter of the sleeve and the hole of the composite structure so as to provide the installed position.

In one embodiment, a composition of the conformable sleeve material has a hardness of X that is about or less than 100 HRB on Rockwell B scale (or 25 HRC on Rockwell C scale). In one embodiment, a composition of the conformable sleeve material has a hardness of X that is about or less than 90 HRB on Rockwell B scale (or 9 HRC on Rockwell C scale.) In one embodiment, a composition of the conformable sleeve material has a hardness of X that is approximately between values of 35 and 100 HRB on Rockwell B scale. In one embodiment, a composition of the conformable sleeve material has a hardness of X that is about or less than 80 HRB on Rockwell B scale (or 0 HRC on Rockwell C scale). In one embodiment, a composition of the conformable sleeve material has a hardness of X that is about or less than 70 HRB on Rockwell B scale. In one embodiment, a composition of the conformable sleeve material has a hardness of X that is approximately between values of 35 and 80 HRB on Rockwell B scale. In one embodiment, a composition of the conformable sleeve material has a hardness of X that is approximately between values of 50 and 100 HRB on Rockwell B scale. In one embodiment, a composition of the conformable sleeve material has a hardness of X that is approximately between values of 60 and 100 HRB on Rockwell B scale.

In one embodiment, a composition of the pin material has a hardness of Y that is about or more than 30 HRC on Rockwell C scale. In one embodiment, a composition of the pin material has a hardness of Y that is about or more than 40 HRC on Rockwell C scale. In one embodiment, a composition of the pin material has a hardness of Y that is approximately between values of 25 and 60 HRC on Rockwell C scale. In one embodiment, a composition of the pin material has a hardness of Y that is about or more than 50 HRC on Rockwell C scale. In one embodiment, a composition of the pin material has a hardness of Y that is about or less than 70 HRC on Rockwell C scale. In one embodiment, a composition of the pin material has a hardness of Y that is approximately between values of 40 and 70 HRC on Rockwell C scale. In one embodiment, a composition of the pin material has a hardness of Y that is approximately between values of 30 and 50 HRC on Rockwell C scale. In one embodiment, a composition of the pin material has a hardness of Y that may be about or less than 25 HRC on Rockwell C scale (or 100 HRB on Rockwell B scale) but is still sufficiently higher than a hardness of X of a composition of the conformable sleeve material to preserve the pin's ability to force the sleeve to expand and create an interference fit with a hole during an installation.

In some embodiments, a composition of the pin material has a hardness of Y that may be RC35 on Rockwell C scale or higher and a hardness of X of a composition of the conformable sleeve material is about 25 HRC on Rockwell C scale or less.

In some embodiments, a composition of the pin material has a hardness of Y that may be higher than a hardness of X of a composition of the conformable sleeve material by about 5 HRC on Rockwell C scale (or 5 HRB on Rockwell B Scale). In some embodiments, a composition of the pin material has a hardness of Y that may be higher than a hardness of X of a composition of the conformable sleeve material by about 10 HRC on Rockwell C scale (or 10 HRB on Rockwell B Scale). In some embodiments, a composition of the pin material has a hardness of Y that may be higher than a hardness of X of a composition of the conformable sleeve material by about 20 HRC on Rockwell C scale (or 20 HRB on Rockwell B Scale). In some embodiments, a composition of the pin material has a hardness of Y that may be higher than a hardness of X of a composition of the conformable sleeve material by about 1-40 HRC on Rockwell C scale or by about 1-40 HRB on Rockwell B scale.

In one embodiment, the material of the conformable sleeve deforms to fill voids between the sleeve and the structure as the sleeve conforms to a contour of the hole of the structure. In embodiments, the conforming sleeve is made from various nickel alloys or materials having similar physical characteristics. In embodiments, the conforming sleeve is made from A286 stainless steel alloy, having a hardness of 85 HRB on Rockwell B scale. In an embodiment, a composition of the conformable sleeve has an electrical conductivity that is about or higher than 20% IACS (International Annealed Copper Standard). In an embodiment, a composition of the conformable sleeve has an electrical conductivity that is about or higher than 30% IACS (International Annealed Copper Standard). In an embodiment, a composition of the conformable sleeve has an electrical conductivity that is about or higher than 50% IACS (International Annealed Copper Standard). In an embodiment, a composition of the conformable sleeve has an electrical conductivity that is about or higher than 70% IACS (International Annealed Copper Standard). In an embodiment, a composition of the conformable sleeve has an electrical conductivity that is about or higher than 90% IACS (International Annealed Copper Standard). In an embodiment, a composition of the conformable sleeve has an electrical conductivity that is about or higher than 100% IACS (International Annealed Copper Standard).

In an embodiment, a core pin, which has a larger diameter than the internal diameter of the conforming sleeve, is moved through the conformable sleeve that results in the sleeve deforming and that the outside diameter of the sleeve conforms into the small voids that are created during drilling of the composite. In an embodiment, the pin may be made of Ti-6Al-4V alloy or materials having similar physical characteristics.

In an application that includes a sealant which is applied to an inner surface of a hole prior to the installation, as the conformable sleeve deforms into voids, it displaces the entrapped sealant. Thus, the conformable sleeve excavates excess entrapped sealant during installation of the fastener, while bringing the sleeve in intimate electrical contact with the composite structure. For purposes of describing the present invention, the term "sealant" identifies viscou materials whose hardness values are sufficiently lower than the values of X of the sleeve material so that the conformable sleeve material is able to displace the sealant from voids in the surface of the hole during an installation of the fastener. In some embodiments, the sealant consists of a non-metallic composition.

In an embodiment, a sleeve interference fastener adapted to be installed in a hole of a composite structure comprising: a.) a conformable sleeve having a head at one end and a tubular portion, wherein the tubular portion is comprised of an inner base layer and an outer coating layer, wherein the tubular portion has an inner diameter and an outer diameter, wherein the outer diameter of the tubular portion is less than an inner diameter of the hole of the composite structure, wherein the inner base layer is comprised of at least one first material having a hardness of X, and wherein the outer coating layer is comprised of at least one second material having a hardness of Y; b.) a pin member, wherein the pin member has at least a pin head at one end, a locking portion at an opposite end of the pin head, and a shank portion therein between, wherein the shank portion, located below the pin head, has a diameter greater than the inner diameter of the tubular portion of the conformable sleeve, and wherein the pin member is comprised of at least one third material having a hardness of Z; c.) wherein X is sufficiently less than Y and wherein Z is equal to or higher than X so that, in an installed position, at least a portion of the outer coating layer of the tubular portion conforms to a contour of an inner surface of the hole so as to create a continuous electrical contact at an interface between the inner surface of the hole of the composite structure and the conformable sleeve; and d) wherein, upon a pressure from the shank portion of the pin member, the conformable sleeve is adapted to expand radially over the inner surface of the hole to form an interference fit between the outer diameter of the sleeve and the hole of the composite structure so as to provide the installed position.

A coating is a covering that is applied to an object, usually with the aim of improving surface properties of a base material, usually referred to as a substrate. Such surface properties may include, amongst others, appearance, adhesion, wetability, corrosion resistance, wear resistance, and scratch. The coatings may be applied as liquids, gases or solids. In an embodiment of the present invention, the outer coating layer remains sufficiently attached to the inner base layer of the sleeve during installation of the conforming fastener into a hole in a workpiece, made for example of a composite material.

In the embodiment, the inner base layer would possess high hardness properties and low malleability or ductility properties. In embodiments, the inner base layer may be made of stainless steel or materials having similar hardness properties. In another embodiment, the outer coating layer possesses low hardness properties and high malleability or ductility.

In one embodiment, a composition of the inner base layer of the sleeve has a hardness of X that is about or higher than 25 HRC on Rockwell C scale. In one embodiment, a composition of the inner base layer of the sleeve has a hardness of X that is about or more than 30 HRC on Rockwell C scale. In one embodiment, a composition of the inner base layer of the sleeve has a hardness of X that is approximately between values of 25 and 50 HRC on Rockwell C scale. In one embodiment, a composition of the inner base layer of the sleeve has a hardness of X that is about or more than 40 HRC on Rockwell C scale. In one embodiment, a composition of the inner base layer of the sleeve has a hardness of X that is about or less than 60 HRC on Rockwell C scale.

In one embodiment, a composition of the outer coating layer of the sleeve has a hardness of Y that is about or less than 100 HRB on Rockwell B scale (or about 25 HRC on Rockwell C scale). In one embodiment, a composition of the outer coating layer of the sleeve has a hardness of Y that is about or less than 90 HRB on Rockwell B scale. In one embodiment, a composition of the outer coating layer of the sleeve has a hardness of Y that is approximately between values of 35 and 100 HRB on Rockwell B scale. In one embodiment, a composition of the outer coating layer of the sleeve has a hardness of Y that is about or less than 80 HRB on Rockwell B scale. In one embodiment, a composition of the outer coating layer of the sleeve has a hardness of Y that is about or less than 70 HRB on Rockwell B scale. In one embodiment, a composition of the outer coating layer of the sleeve has a hardness of Y that is approximately between values of 35 and 80 HRB on Rockwell B scale. In one embodiment, a composition of the outer coating layer of the sleeve has a hardness of Y that is approximately between values of 50 and 100 HRB on Rockwell B scale. In one embodiment, a composition of the outer coating layer of the sleeve has a hardness of Y that is approximately between values of 60 and 100 HRB on Rockwell B scale.

In one embodiment, a composition of the pin material has a hardness of Z that is about or more than 25 HRC on Rockwell C scale. In one embodiment, a composition of the pin material has a hardness of Z that is about or more than 40 HRC on Rockwell C scale. In one embodiment, a composition of the pin material has a hardness of Z that is approximately between values of 23 and 80 HRC on Rockwell C scale. In one embodiment, a composition of the pin material has a hardness of Z that is about or more than 50 HRC on Rockwell C scale. In one embodiment, a composition of the pin material has a hardness of Z that is about or less than 70 HRC on Rockwell C scale. In one embodiment, a composition of the pin material has a hardness of Z that is approximately between values of 40 and 70 HRC on Rockwell C scale. In one embodiment, a composition of the pin material has a hardness of Z that is approximately between values of 30 and 70 HRC on Rockwell C scale. In one embodiment, a composition of the pin material has a hardness of Z that is approximately between values of 25 and 60 HRC on Rockwell C scale. In one embodiment, a composition of the pin material has a hardness of Z that may be about or less than 25 HRC on Rockwell C scale (or about 100 HRB on Rockwell B scale) but is still the same or sufficiently higher than a hardness of X of a composition of the inner base layer of the sleeve to preserve the pin's ability to force the sleeve to expand and create an interference fit with a hole during an installation.

In some embodiments, a hardness Z of a composition of the pin material and/or a hardness X of a composition of the inner base layer are higher than a hardness of Y of a composition of the outer coating layer by about 5 HRC on Rockwell C scale (or 5 HRB on Rockwell B Scale). In some embodiments, a hardness Z of a composition of the pin material and/or a hardness X of a composition of the inner base layer are higher than a hardness of Y of a composition of the outer coating layer by about 10 HRC on Rockwell C scale (or 10 HRB on Rockwell B Scale). In some embodiments, a hardness Z of a composition of the pin material and/or a hardness X of a composition of the inner base layer are higher than a hardness of Y of a composition of the outer coating layer by about 20 HRC on Rockwell C scale (or 20 HRB on Rockwell B Scale). In some embodiments, a hardness Z of a composition of the pin material and/or a hardness X of a composition of the inner base layer are higher than a hardness of Y of a composition of the outer coating layer by about 1-40 HRC on Rockwell C scale (or 1-40 HRB on Rockwell B Scale).

In an embodiment, a composition of the outer coating layer of the sleeve has an electrical conductivity that is about or higher than 20% IACS (International Annealed Copper Standard). In an embodiment, a composition of the outer coating layer of the sleeve has an electrical conductivity that is about or higher than 30% IACS (International Annealed Copper Standard). In an embodiment, a composition of the outer coating layer of the sleeve has an electrical conductivity that is about or higher than 50% IACS (International Annealed Copper Standard). In an embodiment, a composition of the outer coating layer of the sleeve has an electrical conductivity that is about or higher than 70% IACS (International Annealed Copper Standard). In an embodiment, a composition of the outer coating layer of the sleeve has an electrical conductivity that is about or higher than 90% IACS (International Annealed Copper Standard). In an embodiment, a composition of the outer coating layer of the sleeve has an electrical conductivity that is about or higher than 100% IACS (International Annealed Copper Standard).

In some embodiments, the outer coating layer has a thickness of approximately between 3 microns (μm) and 25 microns (μm). In some embodiments, the outer coating layer has a thickness of approximately between 5 microns (μm) and 20 microns (μm). In some embodiments, the outer coating layer has a thickness of approximately between 3 microns (μm) and 15 microns (μm). In some embodiments, the outer coating layer has a thickness of approximately between 10 microns (μm) and 25 microns (μm). In some embodiments, the outer coating layer has a thickness of approximately between 10 microns (μm) and 20 microns (μm). In some embodiments, the outer coating layer has a thickness of approximately between 3 microns (μm) and 10 microns (μm).

For instance, in some embodiments, the outer coating layer may be composed of material(s) selected from a group of relatively soft, i.e. high malleability or ductility, conductive, metallic materials which are known to be galvanically compatible to a composite structure. These materials include, but are not limited to, gold, silver, nickel, copper and tin. Other materials are various alloys, including alloys of gold, silver, nickel, copper and tin. In embodiments, various metallic deformable coatings may be layered on the base material, for example, by way of electroplating, ion-vapor deposition, or using any other comparable technique which would allow the deformable coating to remain sufficiently attached to the base material during the placement of the conforming sleeve into a workpiece, for example into a drilled hole.

In other embodiments, a composition of the deformable coatings of the present invention may consist of a combination of organic material and conductive fillers. As an example, the organic material includes a family of polymers, such as epoxies, and the conductive fillers includes metallic powders or non-conductive materials, such as carbon nano-tubes. In embodiments, various organic based deformable coatings may be layered on the base material, for example, by way of spraying or using any other comparable technique which would allow the deformable organic based coating to remain sufficiently attached to the base material during the placement of the conforming sleeve into a workpiece, for example into a drilled hole.

In some embodiments, compositions of the organic based deforming coatings may have a hardness Y that is about or less than 100 HRB on Rockwell B scale (or about 25 HRC on Rockwell C scale). In one embodiment, a composition of the organic based deforming coatings of the sleeve has a hardness of Y that is about or less than 90 HRB on Rockwell B scale. In one embodiment, a composition of the organic based deforming coatings of the sleeve has a hardness of Y that is approximately between values of 35 and 100 HRB on Rockwell B scale. In one embodiment, a composition of the organic based deforming coatings of the sleeve has a hardness of Y that is about or less than 80 HRB on Rockwell B scale. In one embodiment, a composition of the organic based deforming coatings of the sleeve has a hardness of Y that is about or less than 70 HRB on Rockwell B scale. In one embodiment, a composition of the organic based deforming coatings of the sleeve has a hardness of Y that is approximately between values of 35 and 80 HRB on Rockwell B scale. In one embodiment, a composition of the organic based deforming coatings of the sleeve has a hardness of Y that is approximately between values of 50 and 100 HRB on Rockwell B scale. In one embodiment, a composition of the organic based deforming coatings of the sleeve has a hardness of Y that is approximately between values of 60 and 100 HRB on Rockwell B scale.

In some embodiments, compositions of the organic based deforming coatings may have a volume resistivity at 10V (ohm-m) that is approximately less than $10^3$ ohm-m (measured, for example, in accordance with ASTM D257). In some embodiments, compositions of the organic based deforming coatings may have a volume resistivity at 10V (ohm-m) that is approximately less than $10^2$ ohm-m. In some embodiments, compositions of the organic based deforming coatings may have a volume resistivity at 10V (ohm-m) that is approximately less than 10 ohm-m. In some embodiments, compositions of the organic based deforming coatings may have a volume resistivity at 10V (ohm-m) that is approximately less than $10^{-3}$ ohm-m. In some embodiments, compositions of the organic based deforming coatings may have a volume resistivity at 10V (ohm-m) that is approximately between $1 \times 10^{-8}$ ohm-m and $4 \times 10^{-5}$ ohm-m.

In an application that includes applying a sealant to an inner surface of a hole prior to an installation of a fastener, as a deformable outer coating layer of the conformable sleeve enters voids in an inner surface of the hole, it displaces the entrapped sealant. Thus, the deformable coating of the conformable sleeve excavates excess entrapped sealant during installation of the fastener, while creating intimate electrical contact between the sleeve and the composite structure.

By way of the foregoing, a reduced voltage drop across the interface is created, which, in turn, reduces the dielectric effect caused by the sealant. This minimizes or eliminates the possibility of arcing between the sleeve and the composite panel. In an embodiment, any arcing does not result in sparking.

Embodiments of the conforming sleeves provide excellent gap filling at both macro and micro levels and intimate contact between the sleeves and structures.

Embodiments of the conforming sleeves allow for more efficient current transfer from a fastener to an airplane panel.

Embodiments of the conforming sleeves are less sensitive to the hole quality and micro gaps.

Embodiments of the conforming sleeves reduce the amount of entrapped sealant between the sleeve and the panel.

Figure 3:
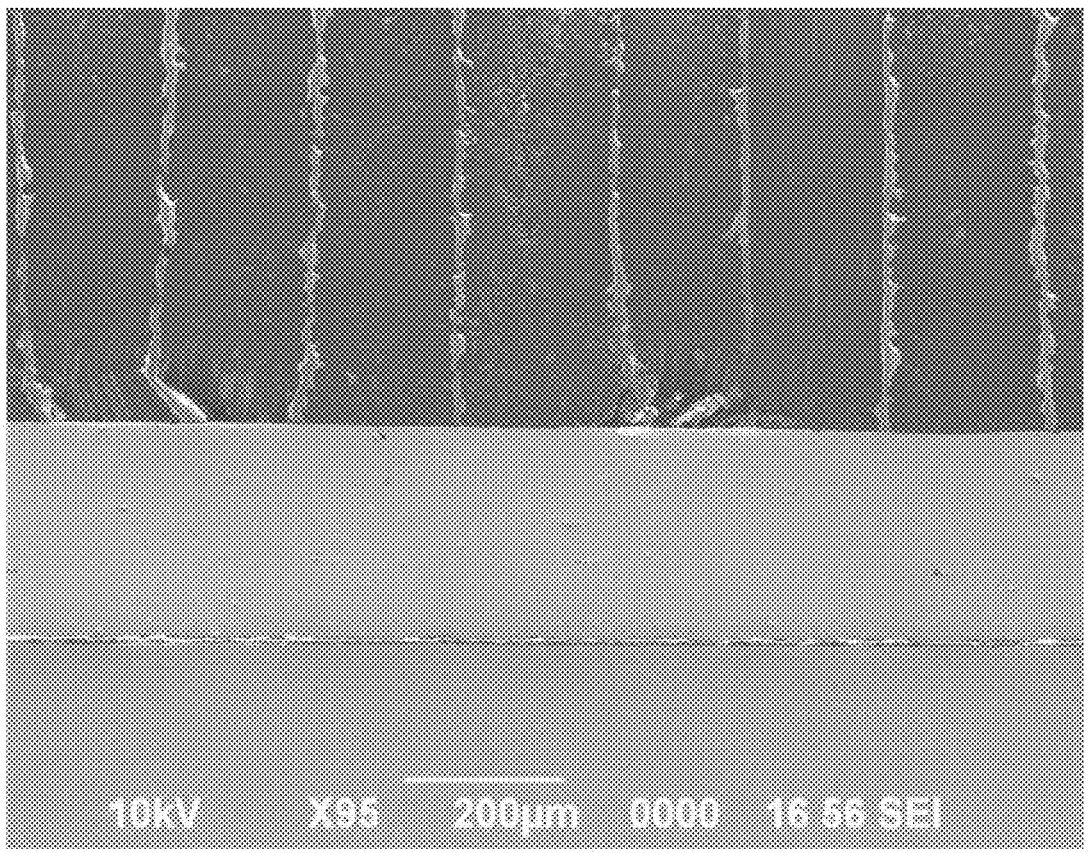
FIG. 3 shows a contact between a sleeve of a conventional fastener and a composite structure.

FIGS. 1 and 3 are photos of contacts between a sleeve of a conventional fastener and a composite structure. An arrow points to the side walls of a slot receiving the fastener that have numerous uneven rough voids created during drilling a hole for the fastener.

Figure 2:
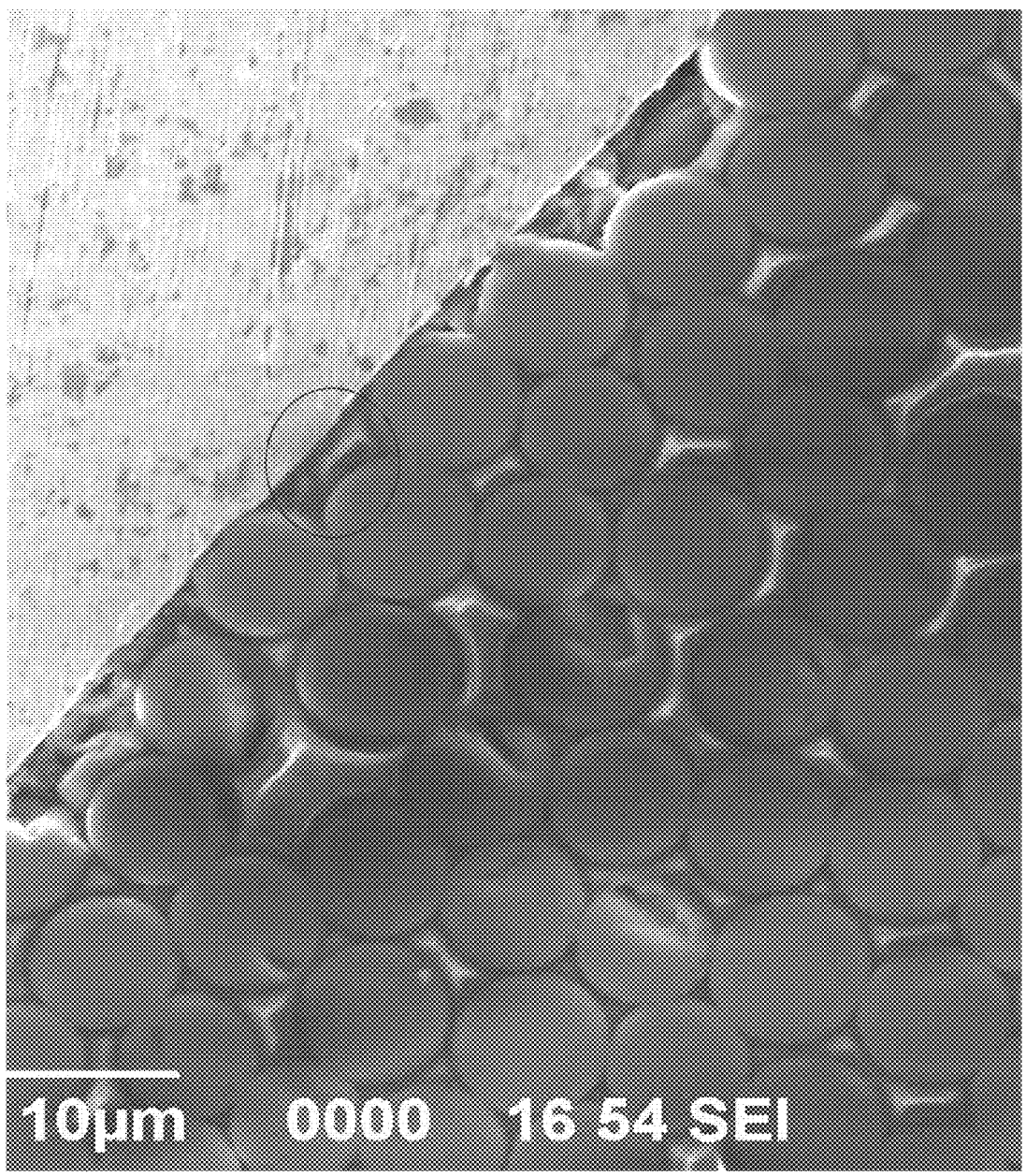
FIG. 2 shows a magnified view of a side wall shown in FIG. 1.
Figure 4:
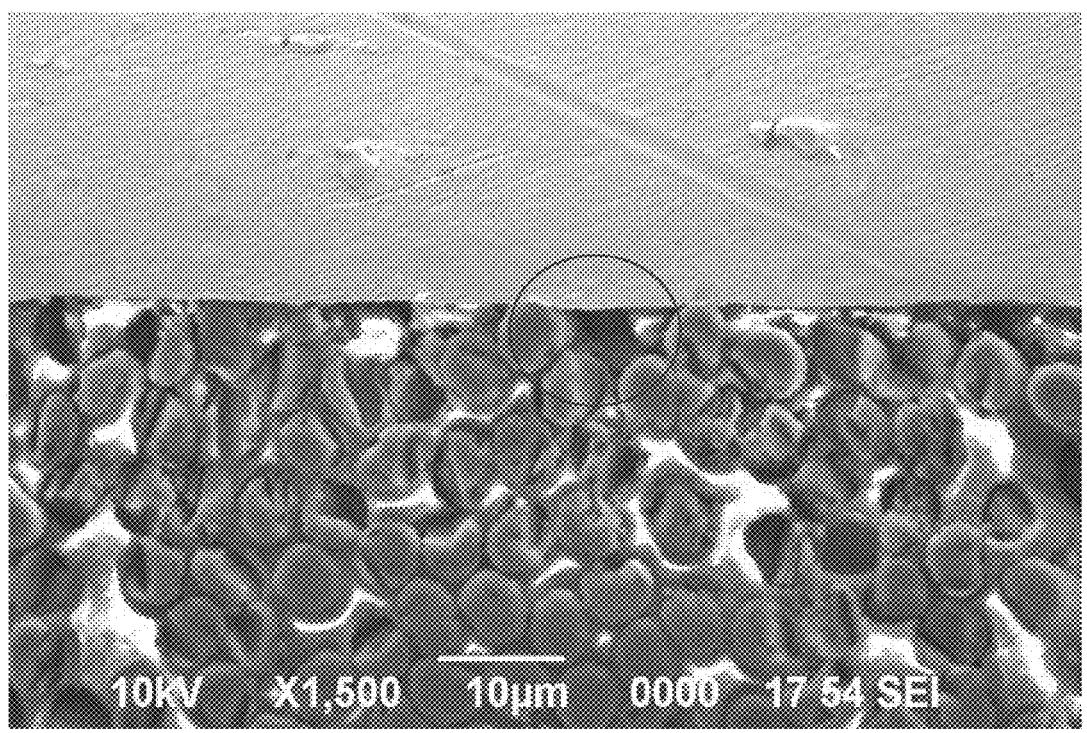
FIG. 4 shows a magnified view of a side wall shown in FIG. 3.

FIGS. 2 and 4 are micro level photos of the condition of the side walls of the slot of FIGS. 1 and 3, respectively. The circles identify voids existing between the sleeve and a side wall of the slot.

Figure 5:
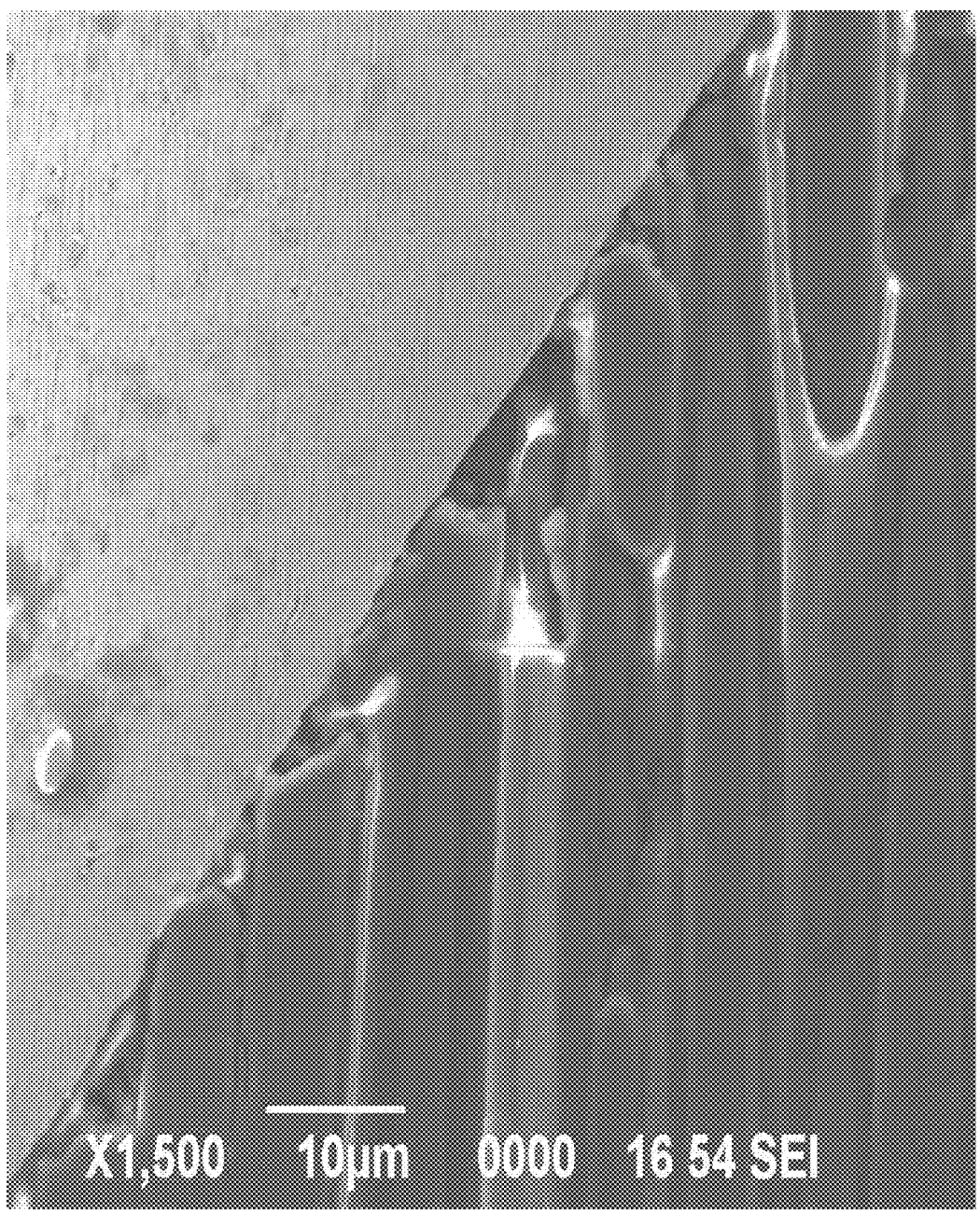
FIG. 5 shows a magnified view of a typical hole in a composite structure.

FIG. 5 is a micro level photo of individual carbon fibers that fracture at irregular angles and form microscopic voids between a sleeve and a carbon fiber reinforced structure. These voids trap excess sealant, which inhibit intimate contact between the sleeve and the structure.

Figure 6:
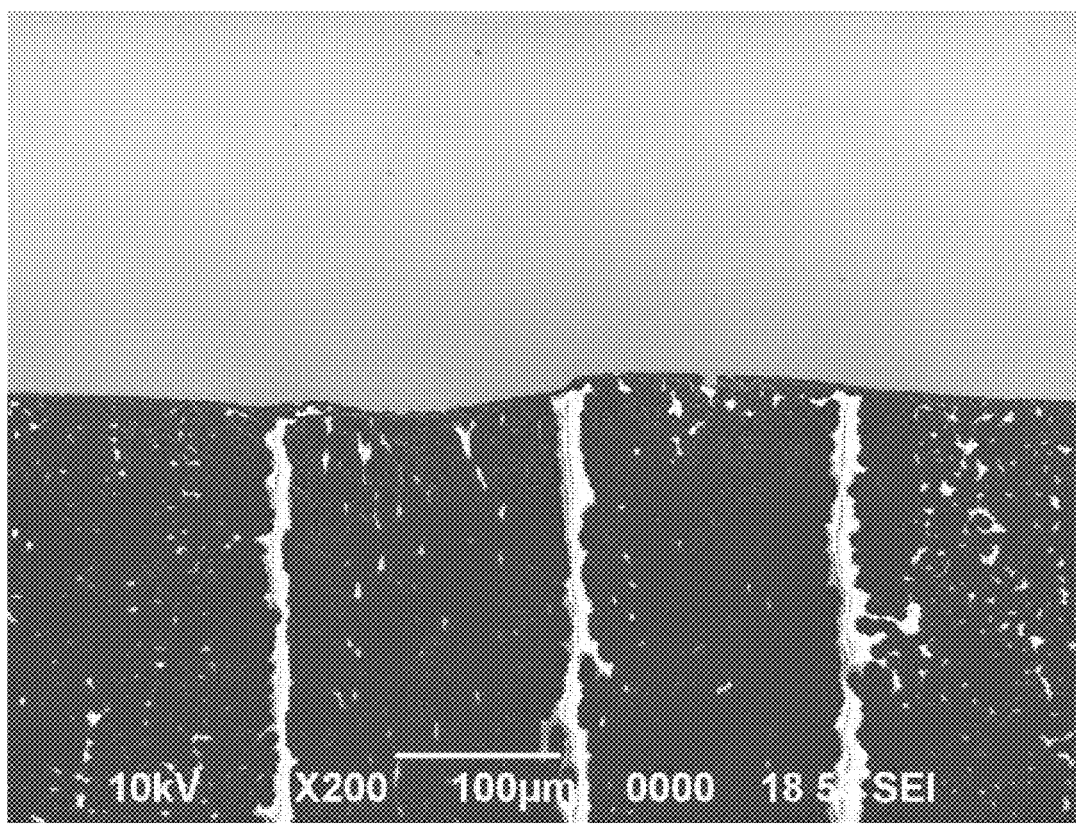
FIG. 6 shows a magnified view of a portion of an embodiment of a sleeve of an installed fastener made in accordance with the invention.
Figure 6A:
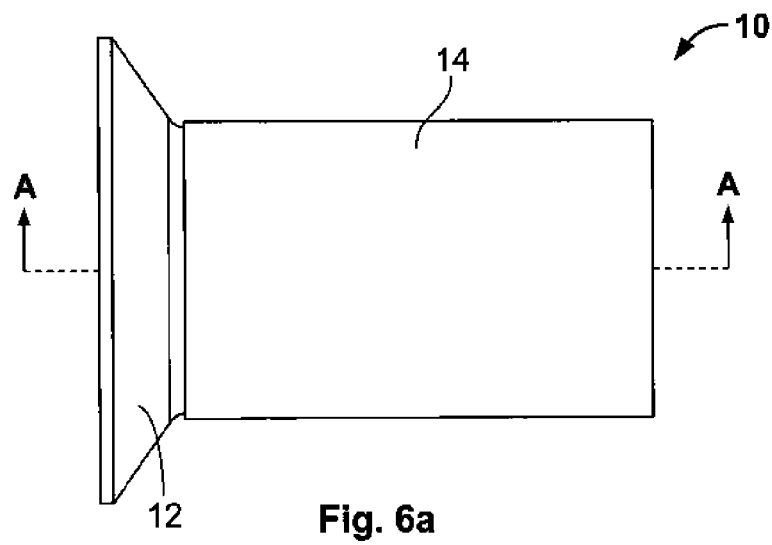
FIG. 6a is a side elevational view of the sleeve shown in FIG. 6.
Figure 6B:
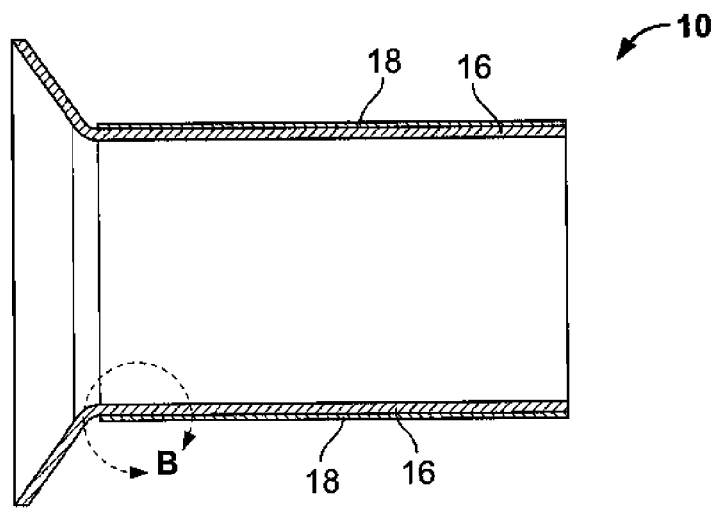
FIG. 6b is a cross-sectional view, taken along section line A-A and looking in the direction of the arrows, of the sleeve shown in FIG. 6b.
Figure 6C:
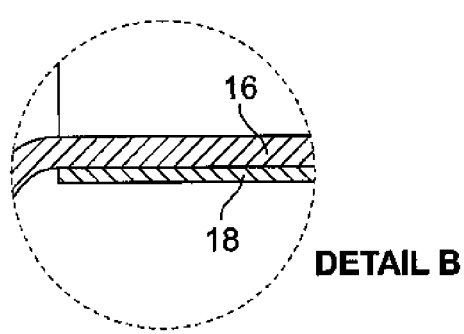
FIG. 6c is an enlarged view of area B of FIG. 6b.

FIG. 6 is a macro level photo showing the conformance between an embodiment of a sleeve made in accordance with the invention and a side wall of the slot which receives the fastener. The photo shows the sleeve's material to be filling imperfections that the side wall may have. FIGS. 6a through 6c show the sleeve 10 having a head 12 at one end and a tubular portion 14, the tubular portion 14 having an inner base layer 16 and an outer coating layer 18.

Figure 7:
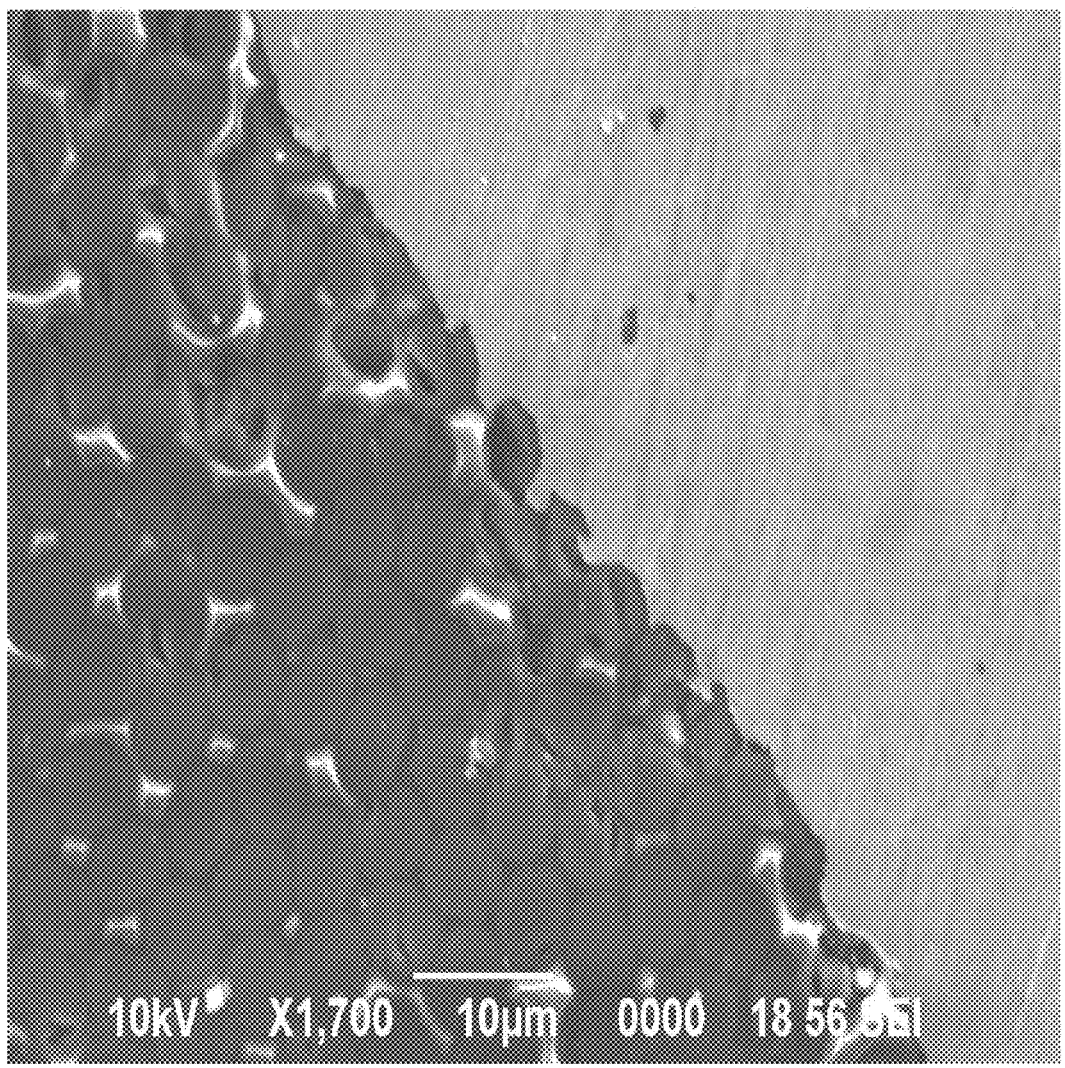
FIG. 7 shows a magnified view of a portion of an embodiment of a sleeve of an installed fastener made in accordance with the invention.
Figure 8:
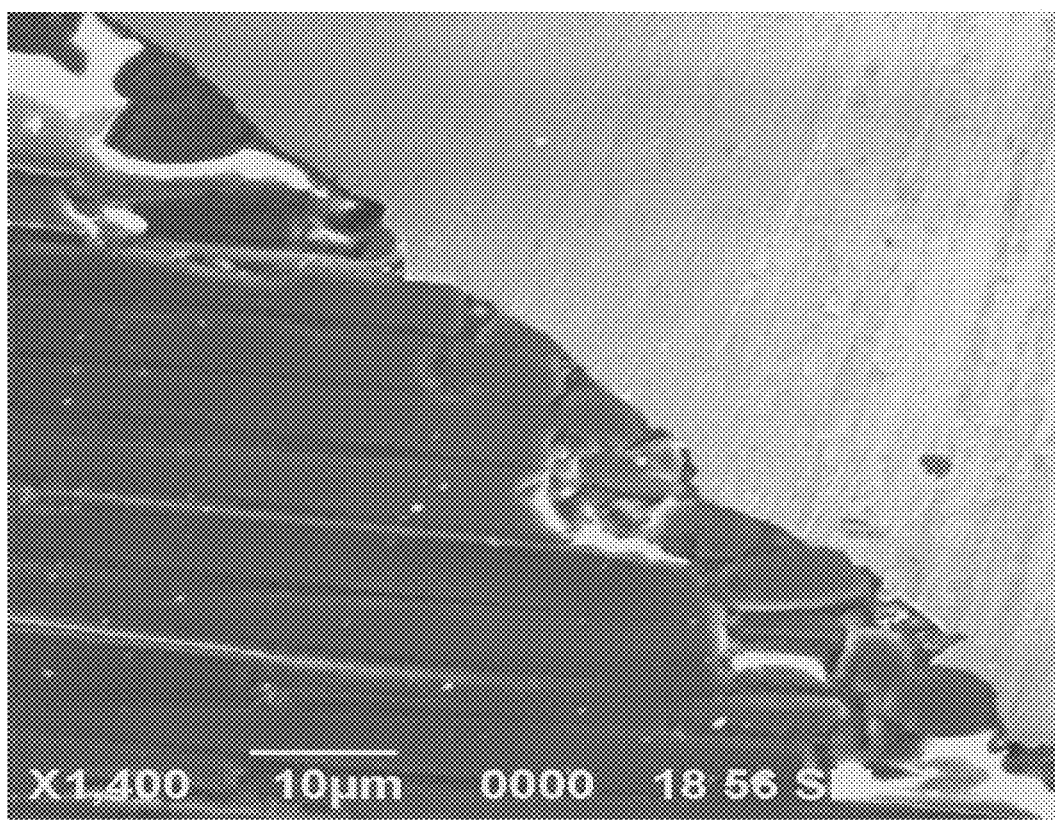
FIG. 8 shows a magnified view of a portion of an embodiment of a sleeve of an installed fastener made in accordance with the invention.

FIGS. 7 and 8 are micro level photos of deformation of embodiments of the sleeve made in accordance with the invention. The photos show intimate contact between the sleeve and individual carbon fibers as the sleeve deforms to fill the microscopic machining induced voids.

Figure 9:
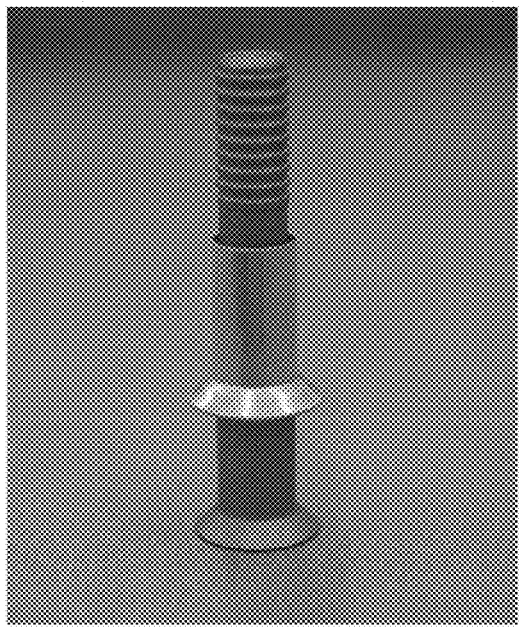
FIGS. 9-13 show some embodiments of the invention.

FIG. 9 is a photo of an embodiment of the invention that includes a sleeve which was electroplated with a deformable, permanently fixed gold coating.

Figure 10:
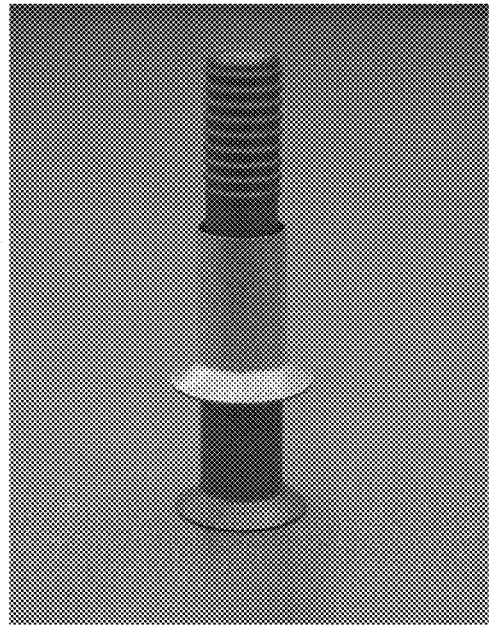

FIG. 10 is a photo of an embodiment of the invention that includes a sleeve which was electroplated with a deformable, permanently fixed silver coating.

Figure 11:
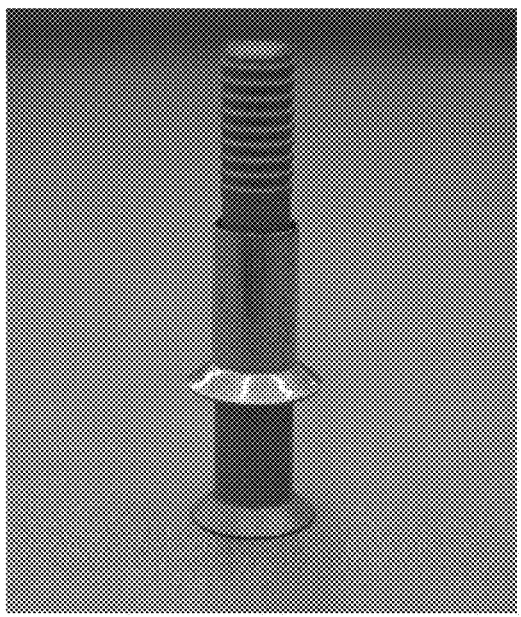

FIG. 11 is a photo of an embodiment of the invention that includes a sleeve which was electroplated with a deformable, permanently fixed nickel coating.

Figure 12:
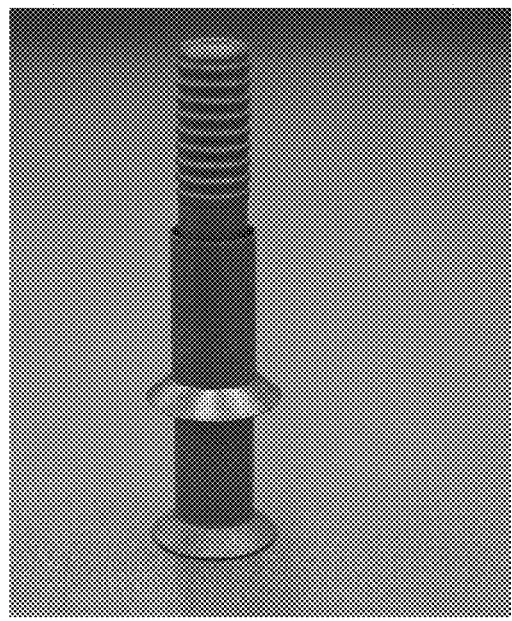

FIG. 12 is a photo of an embodiment of the invention that includes a sleeve with a deformable, permanently fixed aluminum coating which was layered using ion-vapor deposition.

Figure 13:
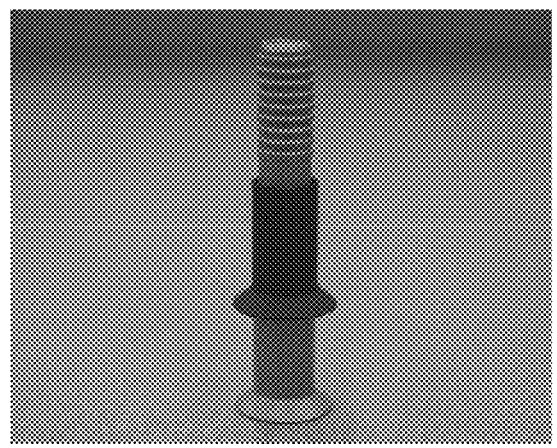

FIG. 13 is a photo of an embodiment of the invention that includes a sleeve which was sprayed on with a deformable, permanently fixed organic coating made with carbon nano-tubes.

Figure 14:
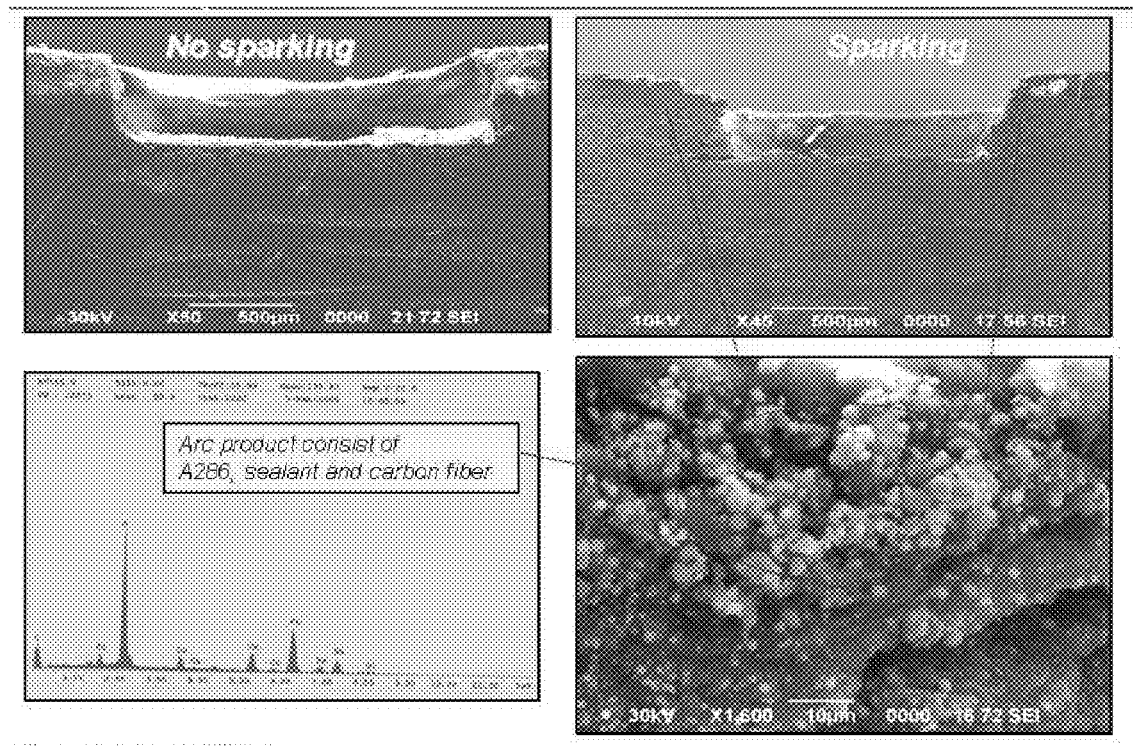
FIG. 14 shows a before-and-after example of a typical sparking event without using the invention.

FIG. 14 show photos of test results of accumulation of a sparking product and its effect on the side walls of a slot which receives a conventional fastener. The top left photo shows rough, fractured side walls of the slot. The top right and the bottom right photos show accumulation of the sparking product between side walls of the slot and the conventional sleeve.

Figure 15:
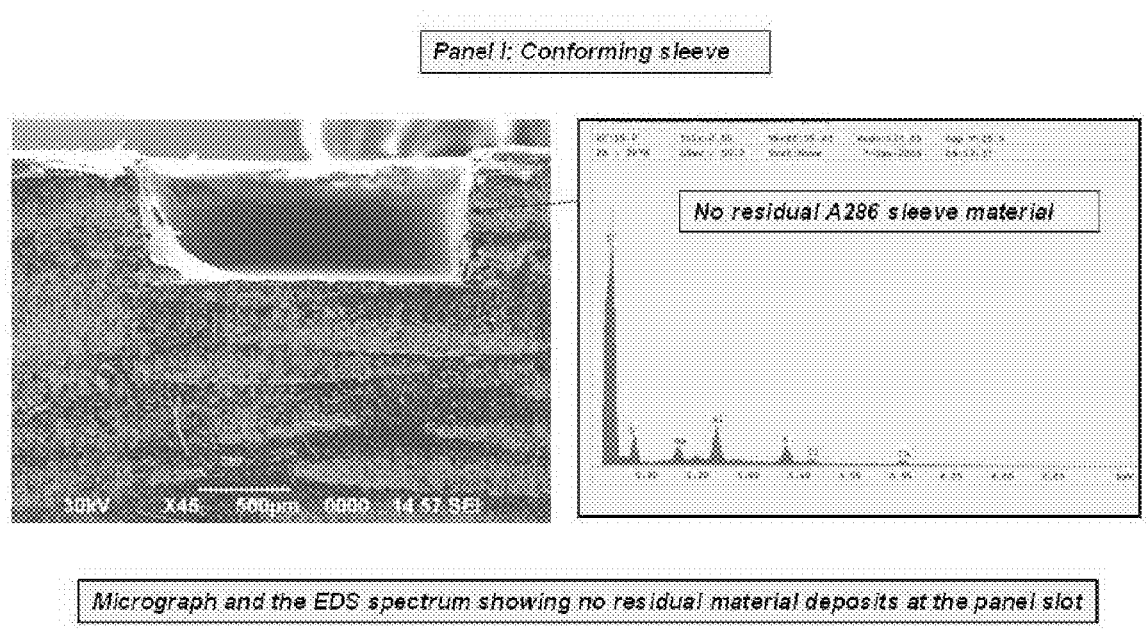
FIG. 15 shows a before-and-after example of a typical sparking event when using an embodiment of the invention.

FIG. 15 are photos of test results showing no accumulation of the sparking product on the side walls of a slot which receives the sleeve made in accordance with the invention. The left photo shows, with an arrow, a side wall which has an even, smooth boundary as of result of having the fastener with the conforming sleeve to be installed into the slot and material from the sleeve's base material or from the sleeve's deformable coating to enter any voids that the side walls may have had.

Figure 16:
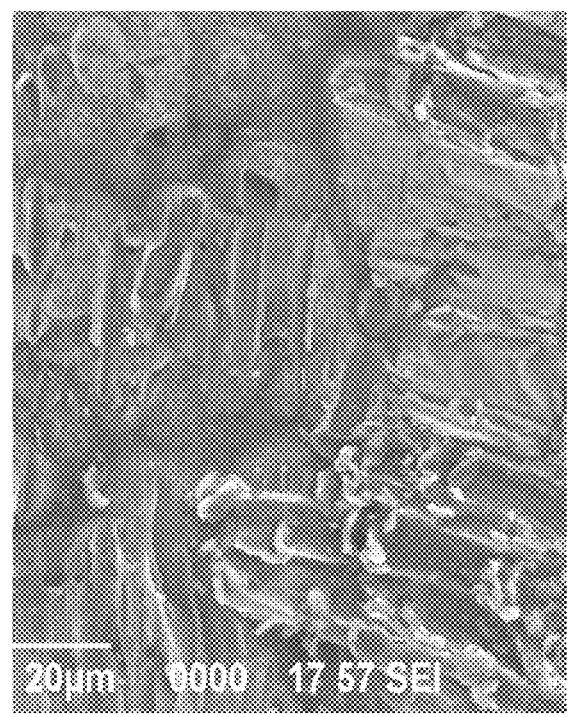
FIG. 16 shows a magnified view of a portion of an embodiment of a sleeve of an installed fastener made in accordance with the invention.

FIG. 16 is a micro level photo showing conformance between an embodiment of the fastener with the conforming sleeve and a side wall of a slot. The photo shows how the sleeve's material or the sleeve's deformable coating conforms to individual carbon fibers—fills voids created by breaks in individual carbon fibers.

Figure 17:
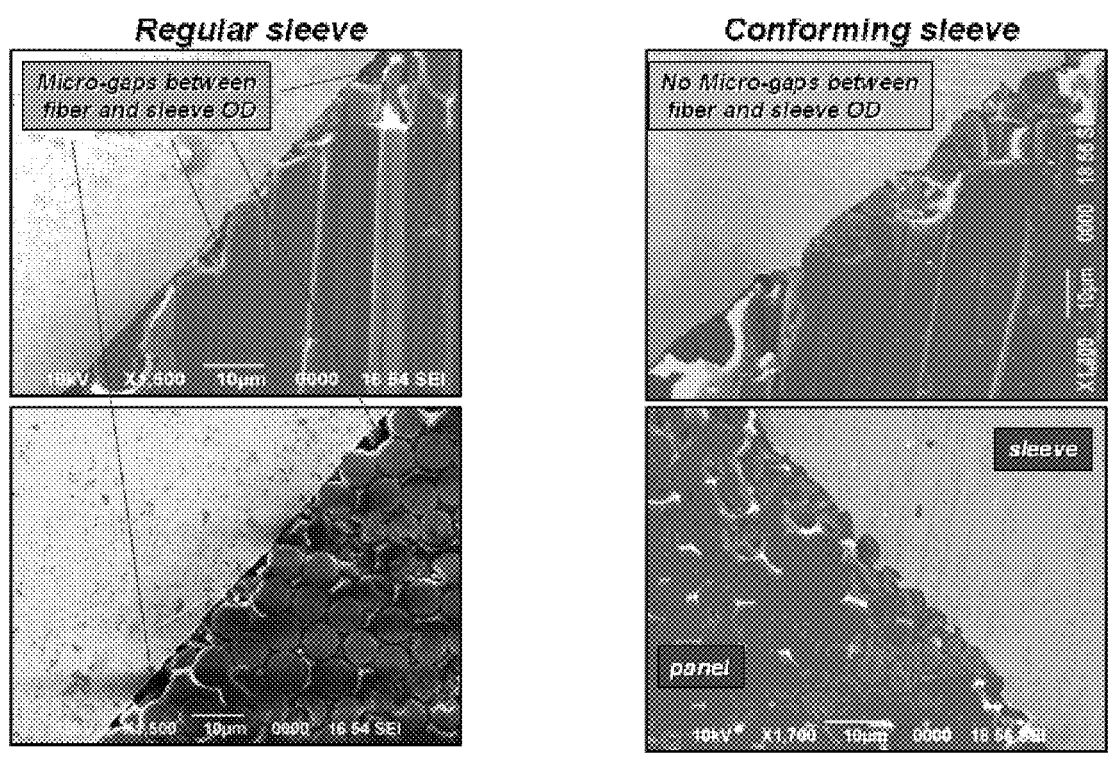
FIG. 17 shows before-and-after examples of sparking events without using the invention and when using an embodiment of the invention.

FIG. 17 are photos of test results showing contrast in the condition of the side walls between a sleeve of a conventional fastener and an embodiment of a fastener with the conforming sleeve made in accordance with the present invention. The top and bottom left photos show the condition when using the conventional fastener. The top and bottom right photos show the condition—filled voids in the side walls of the slot—when using an embodiment of the fastener in accordance with the present invention.

Figure 18:
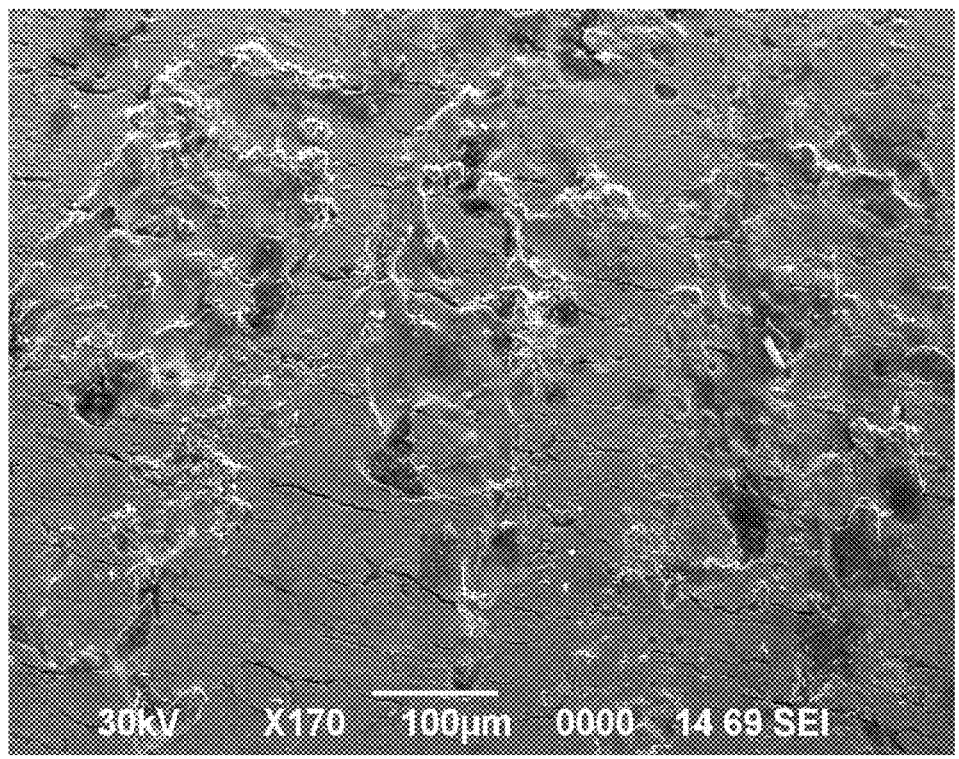
FIG. 18 shows an example of a surface of a hole after a typical sparking event.

FIG. 18 is a micro level photo made after lightning strike testing which shows the side wall of the slot when a regular, conventional A286 sleeve is used. The photo shows the that this sleeve does not conform to the micro texture of the slot's composite structure. The test further shows high arc density and intense arcing, corresponding to the location of residual sealant.

Figure 19:
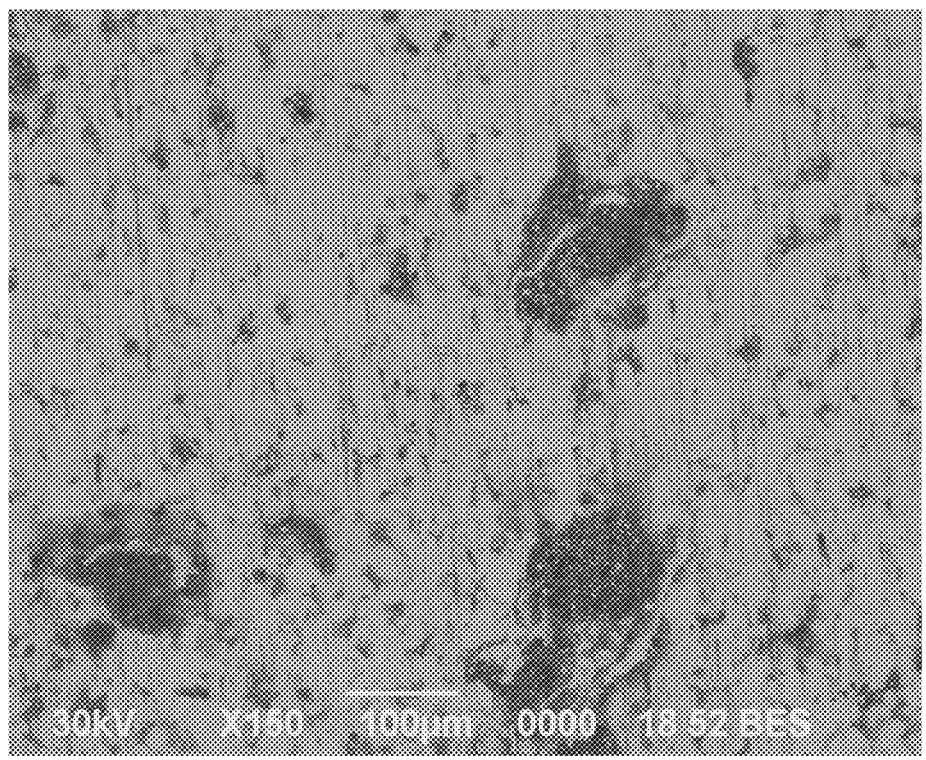
FIG. 19 shows an example of a surface of a hole after a typical sparking event when using an embodiment of the invention.

In contrast to FIG. 18, FIG. 19 is a micro level photo made after lightning strike testing which shows the side wall of the slot when the conforming sleeve of the present invention is used. The photo shows that with the conforming sleeve, there is low arc density, less intense electrical activity, and more fiber sleeve contact.

Table 1 shows results of direct attachment lightning strike tests made using conventional fasteners and embodiments of the conforming sleeve of the present invention. These tests were conducted with panels made of carbon fiber composite material (0.25" thick) and with fasteners of RXL type lockbolts (RXL4BC-VC08-08 pins, collars and sleeves.) Eighteen (18) fasteners were used per panel. Four (4) separate fasteners received lightning strikes per panel. Some of the tests were designed to re-create worst-case installation conditions, such as minimum grip installation and maximum hole size, i.e. minimum interference or contact. The tests were scored on pass/fail criteria based on no detection of light sources on the collar side of the specimen. The test results show that the conforming sleeve (A286 or 300 Series) minimized the sparking at the sleeve/structure interface, and that the conforming sleeves are more tolerable to machining induced texture.

TABLE 1

| Test # | Fastener #2 | Fastener #7 | Fastener #12 | Fastener #17 |
| --- | --- | --- | --- | --- |
| Panel G Thick sleeve | Spark | Spark | Spark | Spark |
| Panel H Window collar + excess sealant | Spark | Spark | Spark | Spark |
| Panel I Conforming sleeve | No spark | No spark | No spark | No spark |
| Panel J Conductive coating on sleeve ID | Spark | Spark | Spark | Spark |
| Panel K Conforming sleeve + conductive coating + Brazil collar | No spark | Spark | No spark | No spark |
| Panel L Conforming 300 sleeve + Conductive coating + Brazil collar | No spark | No spark | No spark | No spark |

Figure 20:
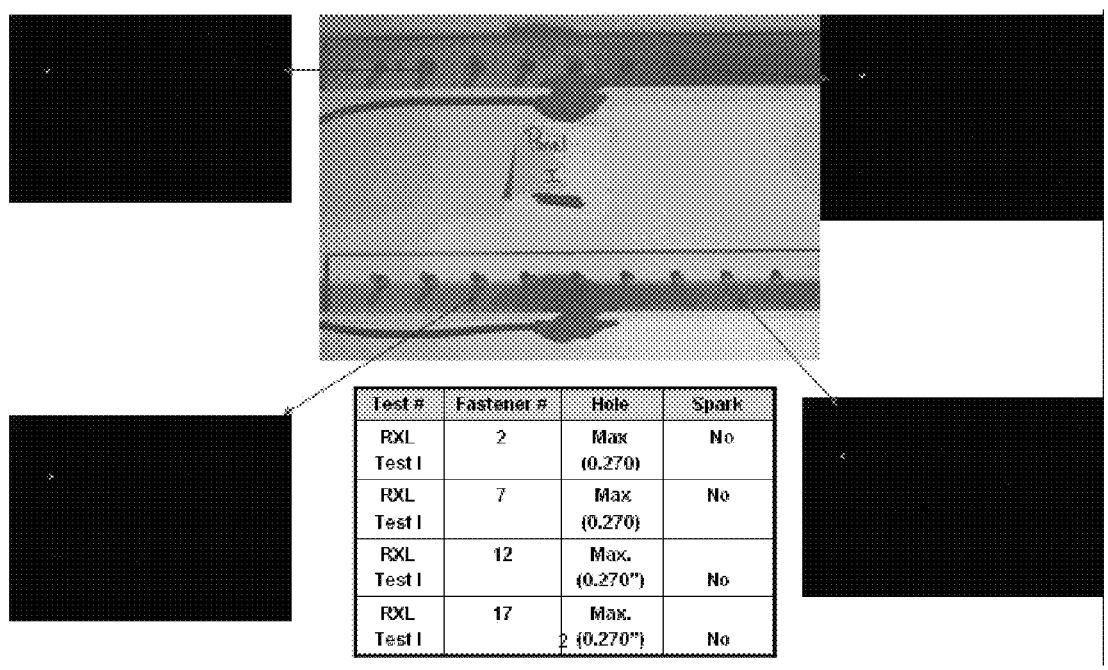
FIG. 20 shows examples of sparking events when using embodiments of the invention.

FIG. 20 shows photos of direct attachment lightning strike tests performed on Panel I in Table 1, which corresponds to the fasteners with the conforming sleeves of the present invention. The white dots represent a reference light, not an actual spark.

In one embodiment, in order to facilitate the movement of the core pin through the conforming sleeve, a lubricant may be used. A lubricant is a substance (often a liquid) introduced between two moving surfaces to reduce the friction between them, improving efficiency and reducing wear; a lubricant may also have the function of dissolving or transporting foreign particles and for distributing heat.

In another embodiments, the lubricant may be a conductive solid film material/coating. In some embodiments, the lubricant based on the conductive solid film material decreases or eliminates the internal arcing between the pin and the sleeve.

The present invention provides for a conductive solid film material ("CSF") incorporating carbon nano-tubes ("CNTs") ("the CSF-CNTs material"). Embodiments of the CSF materials typically have the following main ingredients: methyl ethyl ketone at a concentration of <30-40%, phenolic resin at a concentration of <5-10%, and ethyl alcohol at a concentration of <30-40%.

In an embodiment, the CSF material may exhibit fluid-like behavior. In an embodiment, the CSF may have low viscosity. In some embodiments, the CSF material may be used as a lubricant—a substance (often a liquid) introduced between two moving surfaces to reduce the friction between them, improving efficiency and reducing wear; a lubricant may also have the function of dissolving or transporting foreign particles and for distributing heat.

In some other embodiments, the CSF material may be used as a coating—a covering that is applied to an object, usually with the aim of improving surface properties of a base material, usually referred to as a substrate. Such surface properties may include, amongst others, appearance, adhesion, wetability, corrosion resistance, wear resistance, and scratch. The coatings may be applied as liquids, gases or solids.

In some embodiments, the preferred CSF material would possess a low friction coefficient which would be substantially less than a friction coefficient of 1. In some embodiments, commercially available fastener coatings, such as Incotec Corp.'s 8 G Aluminum coating, Teclube coating, or any aluminum pigment coating, may be used as the CSF material.

The CNTs are carbon compounds with a nano diameter of about between 3 and 200 nm and may have a length-to-diameter ratio as large as 28,000,000:1. The CNTs' length may be up to about 1.0 mm. The CNTs may exhibit very good thermal conductivity along the tube, but good insulation laterally to the tube axis. The CNTs may exhibit tensile strength which is around fifty (50) times higher than steel. Certain CNTs may possess electric conductivity comparable to metallic or semi-conductive material, depending on the CNTs structure. Typically, the CNTs may have density of approximately 1.3 to 2 g/cm$^3$. The CNTs may be single-walled or multi-walled structures. The CNTs may possess small quantity of impurities, such as metal and or amorphous carbon. The CNTs are typically very resistant to oxidation and can even hold up against lengthy immersions in strong acids. In addition, the CNTs are typically not considered acutely toxic, harmful to environment, or made from precious or limited supply precursors.

In some embodiments, the CSF-CNTs materials are made using commercially available CNTs IGMWNTs 90 wt % and IGMWNTs 90 wt % COOH—from Cheap Tubes, Inc. CNTs from other suppliers, for example Nanocyl, may be used.

In some embodiments, the CSF-CNTs material is applied to a surface of an article by way of spraying or using any other comparable technique. In some embodiments, the CSF-CNTs material is deposited onto a surface of an article, when the article is maintained in an environment (e.g. CNTs' reach solution) that facilities the growth, and/or attachment, and/or deposition of CNTs (and other ingredients of a particular composition of the CSF-CNTs material) onto the surface.

In embodiments of the CSF-CNTs material, the CNTs may be dispersed into a solvent with the addition of a small amount of surfactant-wetting agent that lowers the surface tension of a liquid, allowing easier spreading, and lower the interfacial tension between two liquids.

In an embodiment, the CSF-CNTs material contains CNTs with a diameter between about 3 and 30 nm.

In an embodiment, a sufficient amount of CNTs in the CSF-CNTs material may induce high conductivity of the CSF-CNTs material without substantial increase in stiffness of the CSF-CNTs material.

In embodiments, addition of CNTs significantly reduced or eliminated the need to use metal with high conductivity to achieve the same properties of the CSF-CNTs material without a substantial increase in stiffness in contrast to the stiffness property of the base CSF material.

Embodiments of the CSF-CNTs material with CNTs at a concentration of around 1% experience a reduction in resistivity from $>10^{12}$ Ω/square to $\sim 10^5$ Ω/square. Embodiments of the CSF-CNTs material with some CNTs at a concentration of over 1% experience further reductions in resistivity to around 500Ω/square. Using embodiments of the CSF-CNTs material as an aerospace fastener coating provides, for example, fasteners with the desirable property of high conductivity with minimum or no metal particles. Further, in some CSF-CNTs embodiments, the CNTs' size and low loading benefit the surface quality of the coating done with the CSF-CNTs material.

In some embodiments, the CSF-CNTs material may typically contain CNTs at concentrations between 0.05% and 30% of a total weight of lubricant composition. In some embodiments, the CSF-CNTs material may typically contain CNTs at concentrations between 0.1% and 10% of a total weight of a lubricant composition. In some embodiments, the CSF-CNTs material may typically contain CNTs at concentrations between 1% and 10% of a total weight of a lubricant composition. In some embodiments, the CSF-CNTs material may typically contain CNTs at concentrations between 3% and 15% of a total weight of a lubricant composition.

In some embodiments, compositions of the CSF-CNTs material may have a volume resistivity that is approximately less than $10^3$ ohm-m (measured, for example, in accordance with ASTM D257). In some embodiments, compositions of the CSF-CNTs material may have a volume resistivity that is approximately less than $10^2$ ohm-m. In some embodiments, compositions of the CSF-CNTs material may have a volume resistivity that is approximately less than 10 ohm-m. In some embodiments, compositions of the CSF-CNTs material may have a volume resistivity that is approximately less than $10^{-3}$ ohm-m. In some embodiments, compositions of the CSF-CNTs material may have a volume resistivity that is between $1 \times 10^{-8}$ ohm-m and $4 \times 10^{-5}$ ohm-m.

In some embodiments, compositions of the CSF-CNTs material may have a friction coefficient that is approximately less than 0.12μ (measured, for example, on a Falex test machine). In some embodiments, compositions of the CSF-CNTs material may have a friction coefficient that is approximately less than 0.10μ (measured, for example, on a Falex test machine). In some embodiments, compositions of the CSF-CNTs material may have a friction coefficient that is approximately less than 0.2μ (measured, for example, on a Falex test machine). In some embodiments, compositions of the CSF-CNTs material may have a friction coefficient that is approximately less than 0.3μ (measured, for example, on a Falex test machine). In some embodiments, compositions of the CSF-CNTs material may have a friction coefficient that is approximately less than 0.5μ (measured, for example, on a Falex test machine). In some embodiments, compositions of the CSF-CNTs material may have a friction coefficient that is approximately less than 0.8μ (measured, for example, on a Falex test machine). In some embodiments, compositions of the CSF-CNTs material may have a friction coefficient that is approximately between 0.04μ and 0.5μ (measured, for example, on a Falex test machine). In some embodiments, compositions of the CSF-CNTs material may have a friction coefficient that is approximately between 0.04μ and 1μ (measured, for example, on a Falex test machine).

In embodiments, the CSF-CNTs material's desirable properties may also include its simplicity—e.g. a small number of ingredients and lack of special handling procedures.

Table 2 below compares some properties of an embodiment of the CSF-CNTs material based on the commercially available Teclube coating to the properties of Teclube coating itself. Table 2 shows that an embodiment of the CSF-CNTs material, which contains 0.02% of CNTs, demonstrates substantially lower volume resistivity in contrast to the base Teclube coating. Table 2 shows that adding CNTs did not substantially effect the fluidity, i.e., thickness, of Teclube coating with CNTs in contrast to Teclube coating without CNTs.

TABLE 2

| Coating | Thickness | Type of spray | Volume Resistivity @ 10 V (ohm-m) |
|---|---|---|---|
| Teclube | 0.0006 inch | Normal | $2.02 \times 10E12$ |
| Teclube with 0.02% CNT | 0.0005 inch | Normal | <10E3 (below equipment limitations) |

This CSF-CNTs material may be used in variety of applications. In one embodiment, the CSF-CNTs material is used to coat aerospace fasteners. An embodiment of the CSF-CNTs material possesses sufficiently high conductivity enough to provide at least partial protection from lightning strikes. High conductivity, especially near metallic fasteners, is typically necessary for directing large currents, such as those experienced in lightning strikes on airplane composite structures. An embodiment of the CSF-CNTs material provides fasteners with qualities of high thermal conductivity, less weight, and strong resistance to oxidation. In embodiments, since CNTs typically have density around $2.0 \text{ g/cm}^3$—which is approximately one quarter of the density of typical metal particles or flakes that is generally more than $8 \text{ g/cm}^3$,—using the CSF-CNTs material helps to reduce aerospace fastener coating weight and overall airplane weight. Further, using embodiments of the CSF-CNTs material as aerospace fastener coatings substantially enhances physical properties, including electric and thermal conductivity, reduce mass, toughness and durability at low concentrations of CNTs over concentrations of metals in conventional metal based conductive coatings.

In some embodiments, the CSF-CNTs material is applied to the outside surface of the sleeve, which is exposed to the walls of a slot which receives the fastener. In some embodiments, the CSF-CNTs material is applied to both inside and outside surfaces of the sleeve. In some embodiments, the CSF-CNTs material is applied to both the surface of the pin and the interior surface of the sleeve. In some embodiments, the CSF-CNTs material is applied to the surface of the pin. In some embodiments, the CSF-CNTs material is applied to all surfaces of the sleeve and the pin. Applying the CSF-CNTs material to either the inside walls of the sleeve or to the exterior surface of the pin, or to both of these surfaces, reduces resistance which the pin experiences during its introduction into the sleeve. In some embodiments, having the CSF-CNTs coating between the surface of the pin and the interior surface of the sleeve provides at least partial protection from lightning strikes.

In some embodiments, benefits provided by having a layer of the CSF-CNTs material are obtained when the CSF-CNTs layer has a thickness between approximately 3 microns (μm) and 25 microns (μm). In some embodiments, benefits provided by having a layer of the CSF-CNTs material are obtained when the CSF-CNTs layer has a thickness between approximately 5 microns (μm) and 20 microns (μm). In some embodiments, benefits provided by having a layer of the CSF-CNTs material are obtained when the CSF-CNTs layer has a thickness between approximately 3 microns (μm) and 15 microns (μm). In some embodiments, benefits provided by having a layer of the CSF-CNTs material are obtained when the CSF-CNTs layer has a thickness between approximately 10 microns (μm) and 25 microns (μm). In some embodiments, benefits provided by having a layer of the CSF-CNTs material are obtained when the CSF-CNTs layer has a thickness between approximately 10 microns (μm) and 20 microns (μm). In some embodiments, benefits provided by having a layer of the CSF-CNTs material are obtained when the CSF-CNTs layer has a thickness between approximately 3 microns (μm) and 10 microns (μm).

Figure 21:
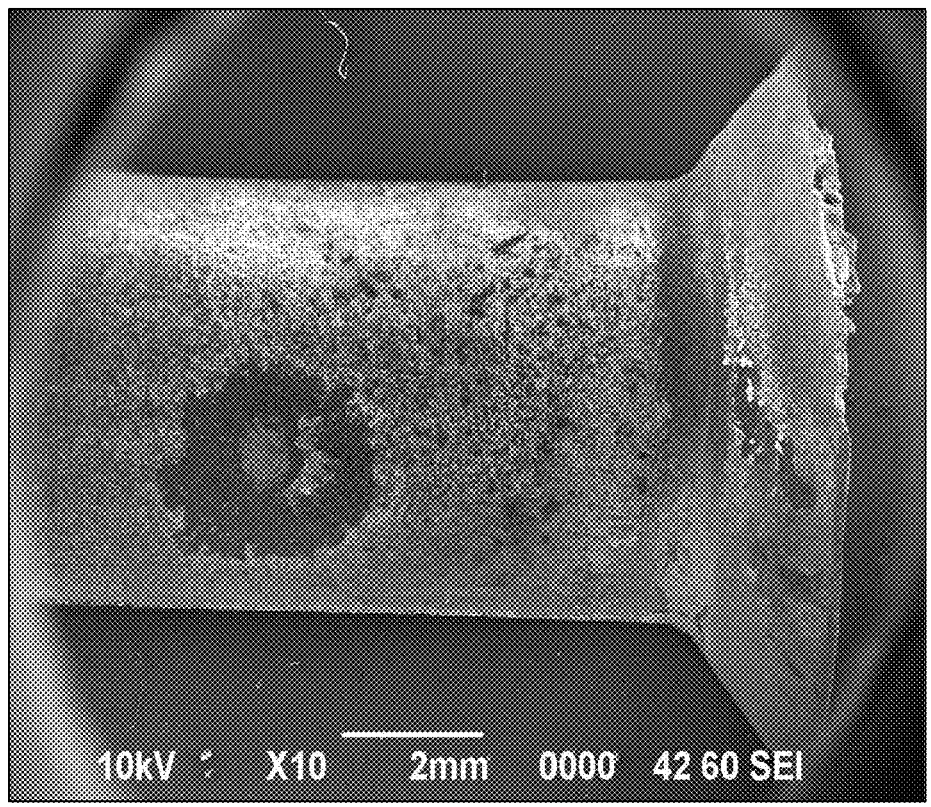
FIG. 21 shows a magnified view of a sleeve of a conventional fastener after a lightning strike test, without using the invention.

FIG. 21 is a macro level photo of a conventional fastener sleeve without the CSF-CNTs coating after a lightning strike test, showing a severely damaged surface of the sleeve.

Figure 22:
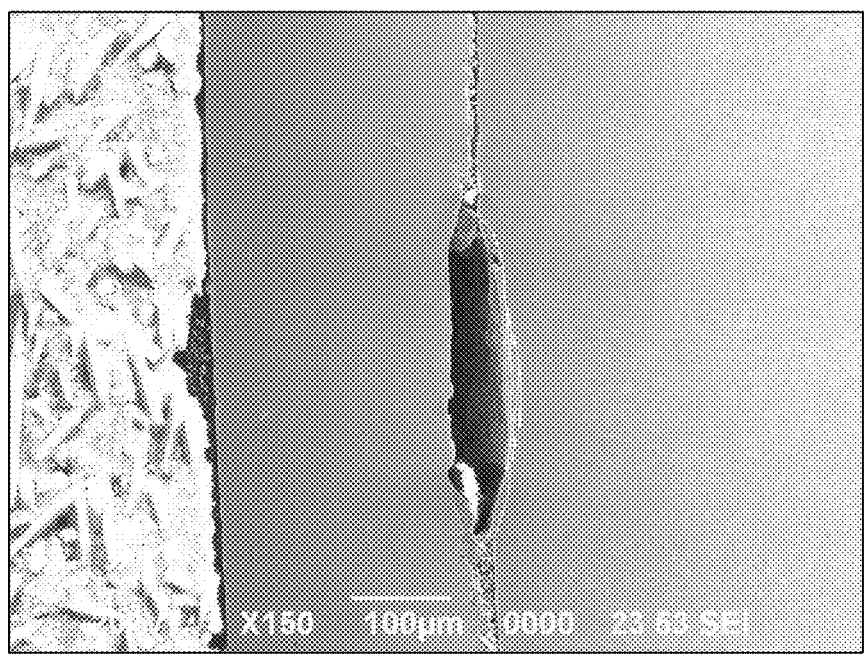
FIG. 22 shows a magnified view of a portion of an installed conventional fastener.

FIG. 22 is a macro level photo showing a hole in a gap between a sleeve of a conventional fastener and a wall of a slot which receives the fastener. In embodiments, the CSF-CNTs coating may substantially fill this hole, preventing or decreasing chances of the lightning-induced sparking.

Figure 23:
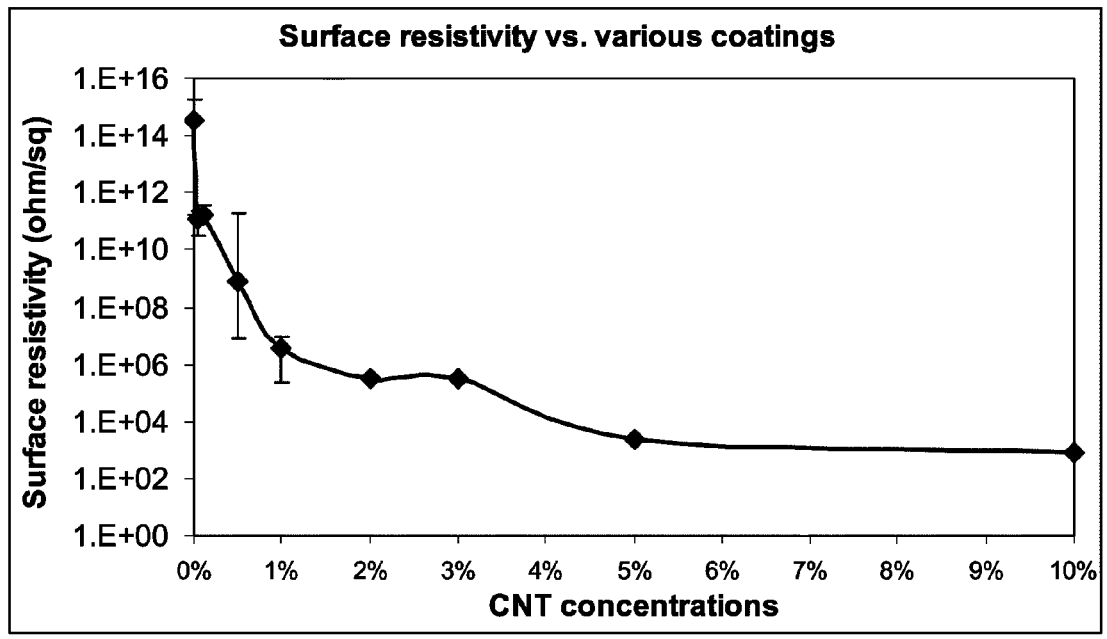
FIGS. 23-26 show graphs concerning some embodiments of the invention.

FIG. 23 is a graph showing how increasing the concentration (total weight %) of CNTs in some embodiments of the CSF-CNTs materially effects surface resistivity of those embodiments as coatings. The coating was applied onto a fiberglass substrate.

Figure 24:
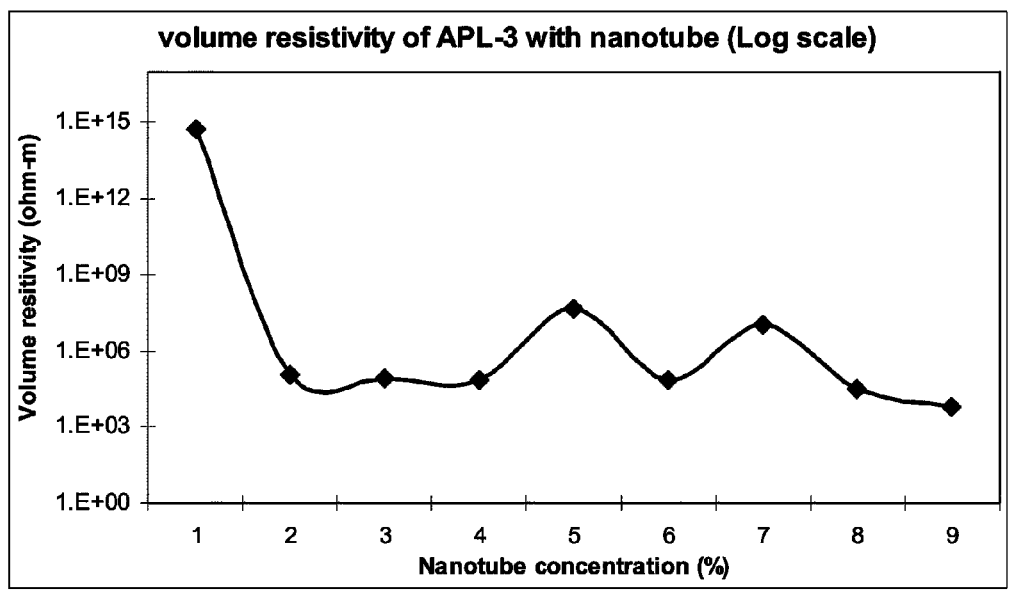

FIG. 24 is a graph showing how increasing the concentration (total weight %) of CNTs in an embodiment of the CSF-CNTs material effects volume resistivity of the embodiment. The graph shows that for this particular embodiment, adding 0.050% of CNTs produces the desirable drop in the volume resistivity. The coating was applied onto a metal substrate.

Figure 25:
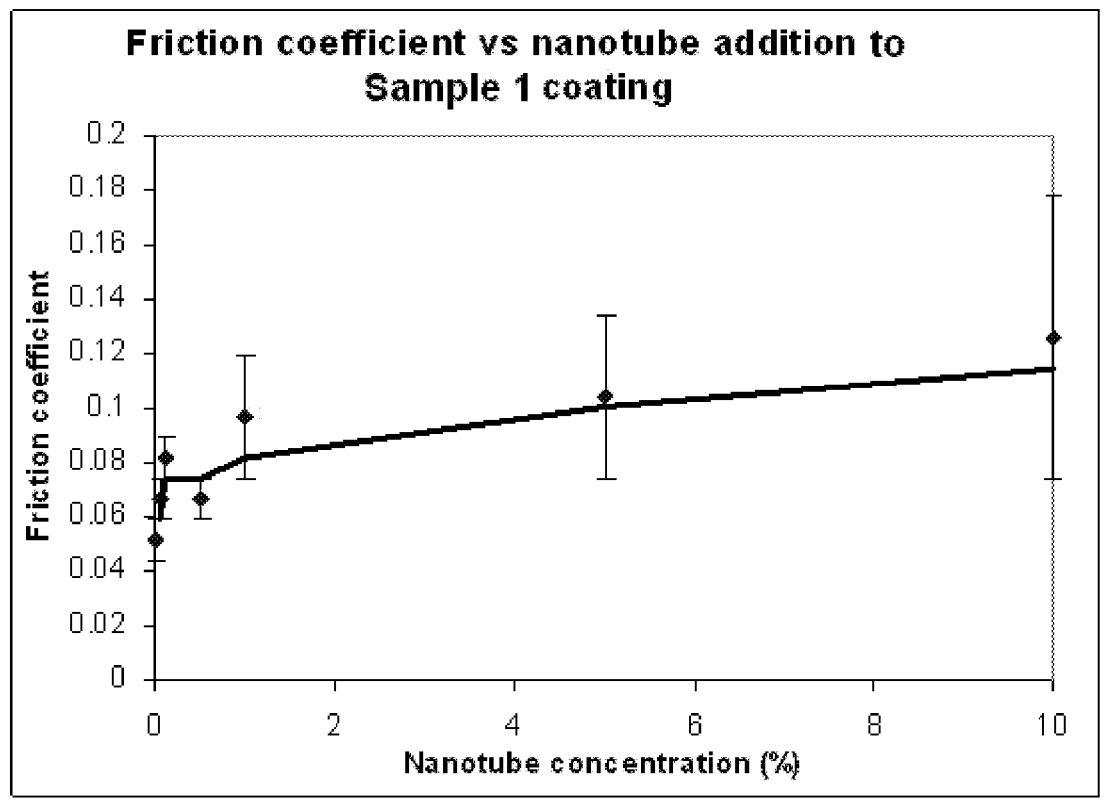

FIG. 25 is a graph showing how increasing the concentration of CNTs in an embodiment of the CSF-CNTs material (Sample 1) effects the friction coefficient of the embodiment. The graph shows that increasing the concentration of CNTs in this particular CSF-CNTs coating leads to a slow and gradual increase in friction coefficient. Measurement of the friction coefficient was conducted using a Falex testing machine at a load of 200 pounds.

Figure 26:
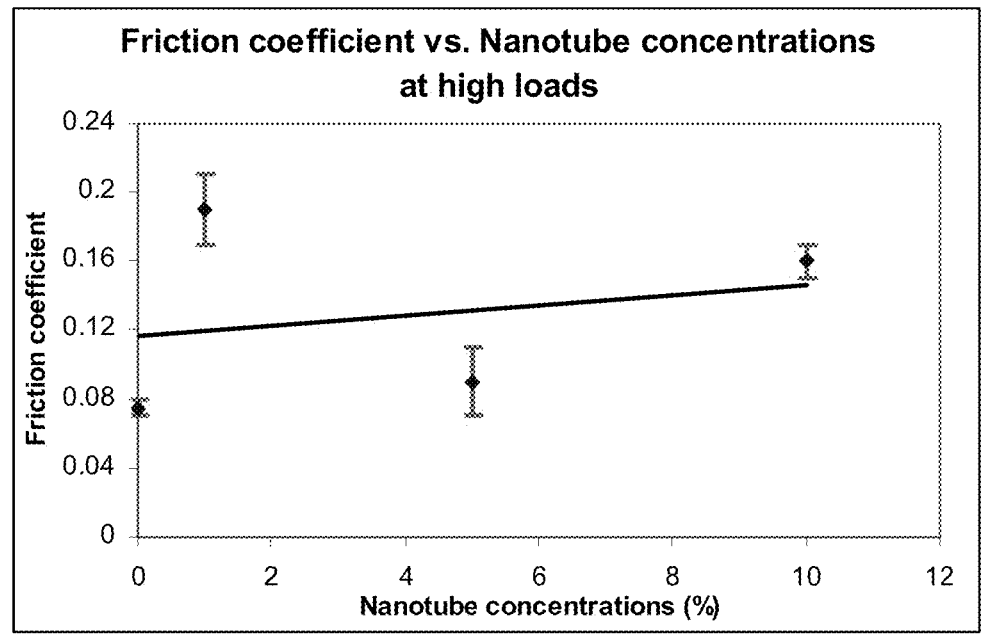

FIG. 26 is a graph showing how high concentrations (total weight %) of CNTs in another embodiment of the CSF-CNTs material affect the friction coefficient of the embodiment. The graph shows that increasing the concentration of CNTs in this particular CSF-CNTs coating leads to a consistent increase in friction coefficient. Measurement of the friction coefficient was conducted using a Falex testing machine at a load of 500 pounds.

Figure 27:
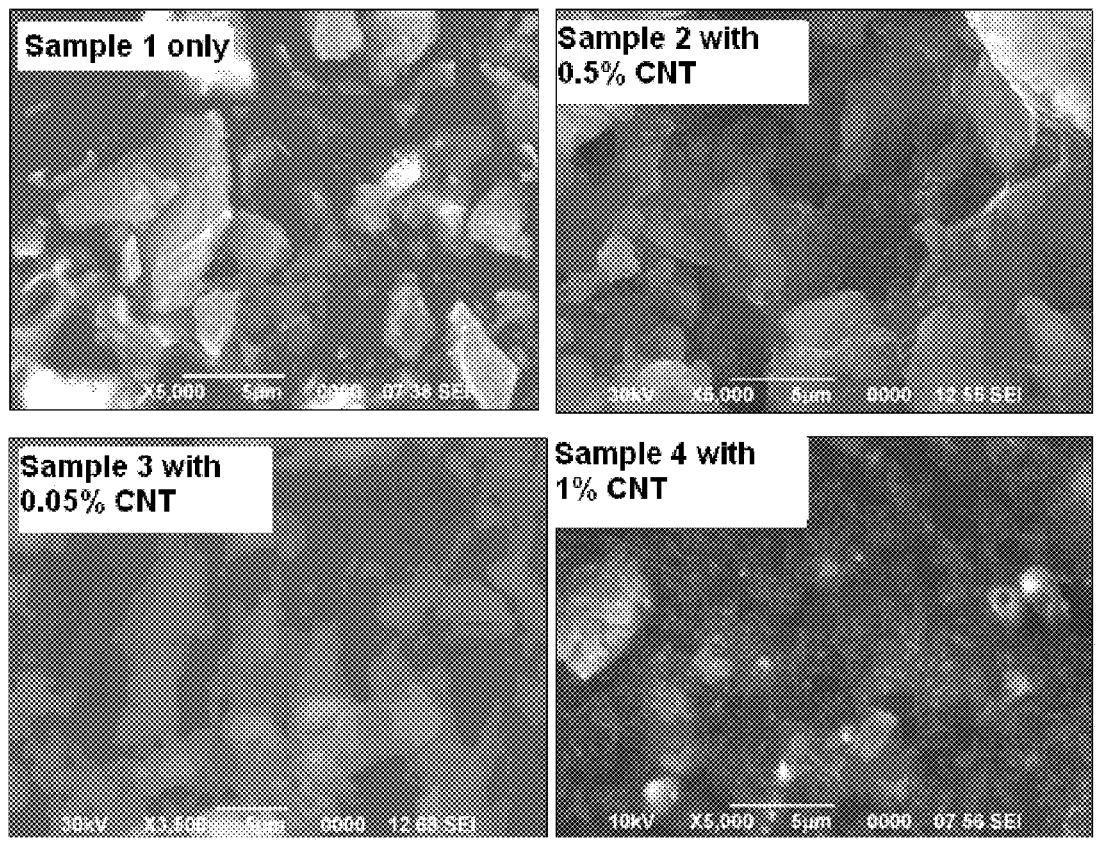
FIG. 27 shows magnified views of some embodiments of the invention.

FIG. 27 are macro level photos of the physical consistency of embodiments of the CSF-CNTs coatings having various concentrations (total weight %) of CNTs in them. The top left photo shows the physical consistency of a CSF coating with no CNTs. The bottom left photo shows the physical consistency of a CSF-CNTs coating containing 0.05% of CNTs in its body. The top right photo shows the physical consistency of a CSF-CNTs coating containing 0.5% of CNTs in its body. The bottom right photo shows the physical consistency of a CSF-CNTs coating containing 1% of CNTs in its body.

Figure 28:
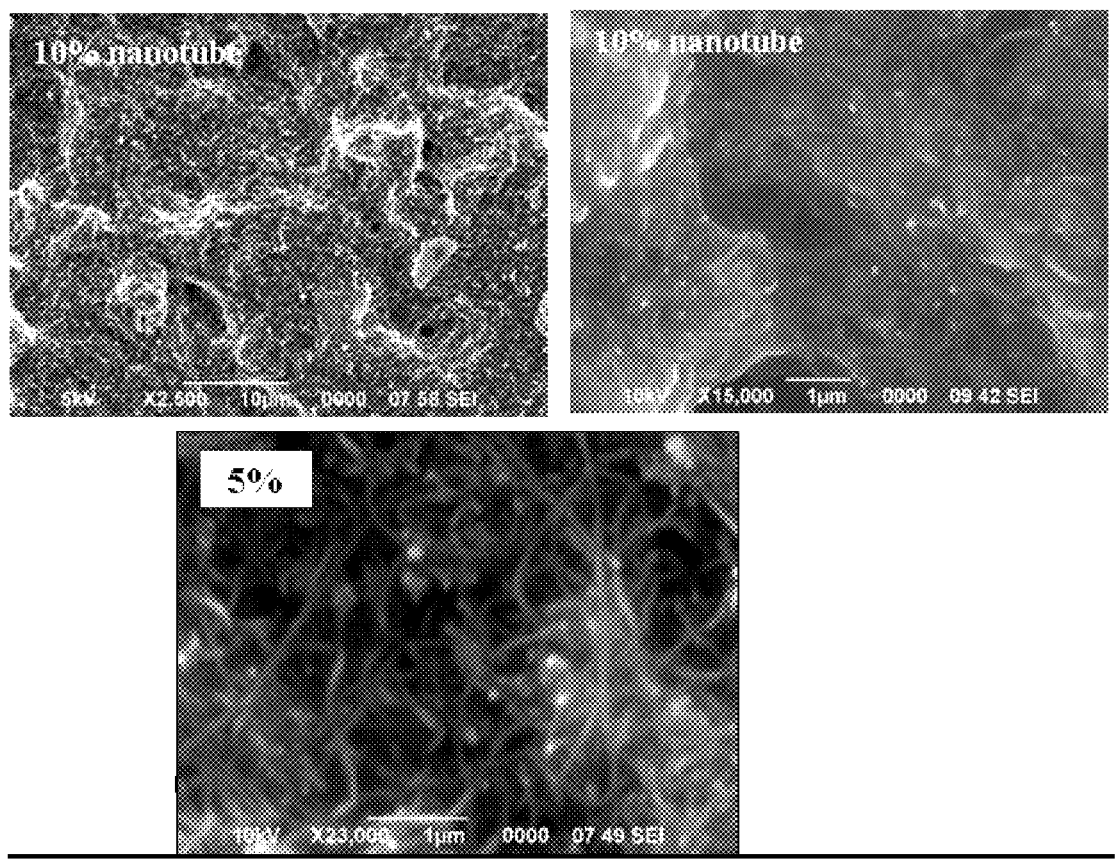
FIG. 28 shows magnified views of some other embodiments of the invention.

FIG. 28 are macro level photos of physical consistency of embodiments of the CSF-CNTs coatings having various concentrations (total weight %) of CNTs in them. The top left photo, taken at a lower magnification, shows the physical consistency of a CSF-CNTs coating containing 10% of CNTs in its body. The top right photo, taken at a higher resolution, shows the physical consistency of a CSF-CNTs coating containing 10% of CNTs in its body. The bottom photo shows the physical consistency of a CSF-CNTs coating containing 5% of CNTs in its body.

Figure 29:
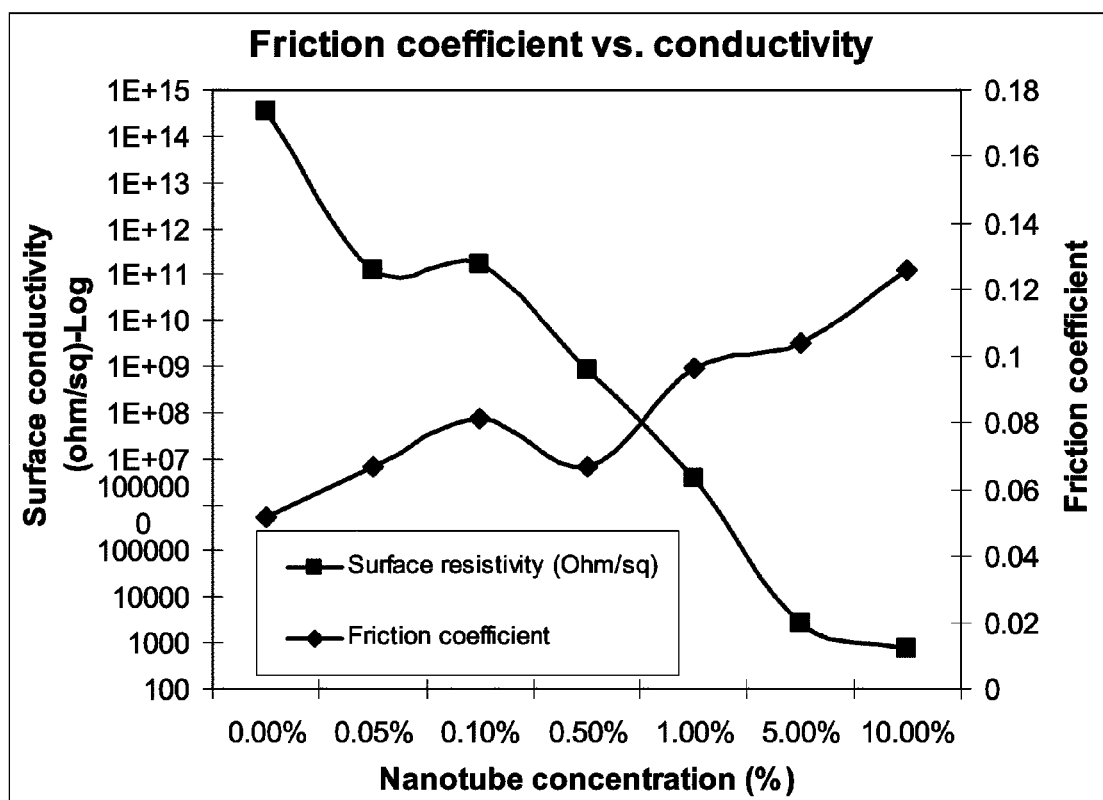
FIG. 29 shows a graph concerning some embodiments of the invention.

FIG. 29 is a graph showing effects on surface conductivity (top-to-bottom, pink line) and friction coefficient (bottom-to-top, blue line) of embodiments of the CSF-CNTs material having various concentrations (total weight %) of CNTs. In some embodiments, the concentrations of CNTs between about 0.05% to about 3.0% provides a desired increase in surface conductivity without substantial increase in the friction coefficient of the embodiments.

We claim:

1. A sleeve interference fastener adapted to be installed in a hole of a composite structure comprising:
   a.) a conformable sleeve having a head at one end and a tubular portion, wherein the tubular portion is comprised of an inner base layer and an outer coating layer, wherein the tubular portion has an inner diameter and an outer diameter, wherein the outer diameter of the tubular portion is less than an inner diameter of the hole of the composite structure, wherein the inner base layer is comprised of at least one first material having a hardness of X, and wherein the outer coating layer is comprised of at least one second material having a hardness of Y;
   b.) a pin member, wherein the pin member has at least a pin head at one end, a locking portion at an opposite end of the pin head, and a shank portion therein between, wherein the shank portion, located below the pin head, has a diameter greater than the inner diameter of the tubular portion of the conformable sleeve, and wherein the pin member is comprised of at least one third material having a hardness of Z;
   c.) wherein X is sufficiently less than Y and wherein Z is equal to or higher than X so that, in an installed position, at least a portion of the outer coating layer of the tubular portion conforms to a contour of an inner surface of the hole so as to create a continuous electrical contact at an interface between the inner surface of the hole of the composite structure and the conformable sleeve; and
   d) wherein, upon a pressure from the shank portion of the pin member, the conformable sleeve is adapted to expand radially over the inner surface of the hole to form an interference fit between the outer diameter of the sleeve and the hole of the composite structure so as to provide the installed position.

2. The sleeve interference fastener of claim 1, wherein the outer layer is a fixed solid coating.

3. The sleeve interference fastener of claim 2, wherein the fixed solid coating comprises i) at least one organic material and ii) at least one conductive filler material.

4. The sleeve interference fastener of claim 2, wherein the fixed solid coating comprises a metal material.

5. The sleeve interference fastener of claim 4, wherein the metal material comprises one or more metal elements selected from a group consisting of silver, aluminum, gold, and nickel.

6. The sleeve interference fastener of claim 1, wherein X is less than 100 HRB on Rockwell B scale.

7. The sleeve interference fastener of claim 1, wherein the inner surface of the hole has a sealant when the fastener is in the installed position.

8. The sleeve interference fastener of claim 1, wherein, to facilitate a movement of the pin member through the conformable sleeve, the fastener further comprises a lubricant.

9. The sleeve interference fastener of claim 8, wherein the lubricant comprises a conductive solid film material.

10. The sleeve interference fastener of claim 9, wherein the conductive solid film material comprises carbon nano-tubes at a concentration between 0.05 to 30 percent of a total weight of the conductive solid film material.

* * * * *

UNITED STATES PATENT AND TRADEMARK OFFICE
CERTIFICATE OF CORRECTION

PATENT NO. : 8,322,958 B2  
APPLICATION NO. : 12/753336  
DATED : December 4, 2012  
INVENTOR(S) : Luke Haylock et al.

Page 1 of 1

It is certified that error appears in the above-identified patent and that said Letters Patent is hereby corrected as shown below:

In the Specification:

Col. 2, Ln. 51, Delete "X" after the phrase "wherein" and Insert --Y--.

Col. 2, Ln. 51, Delete "Y" after the phrase "sufficiently less than" and Insert --X--.

Col. 7, Ln. 22, Delete "X" after the phrase "wherein" and Insert --Y--.

Col. 7, Ln. 22, Delete "Y" after the phrase "sufficiently less than" and Insert --X--.

Signed and Sealed this  
Fifth Day of November, 2013

Teresa Stanek Rea  
*Deputy Director of the United States Patent and Trademark Office*